(12) United States Patent
Nakajima et al.

(10) Patent No.: US 6,847,788 B2
(45) Date of Patent: Jan. 25, 2005

(54) SYSTEM AND METHOD FOR EQUALIZING TRANSMISSION CHARACTERISTICS IN WAVELENGTH DIVISION MULTIPLEXING OPTICAL COMMUNICATION SYSTEM

(75) Inventors: Isao Nakajima, Kawasaki (JP); Shin-ichirou Harasawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 583 days.

(21) Appl. No.: 09/749,419

(22) Filed: Dec. 28, 2000

(65) Prior Publication Data

US 2001/0019436 A1 Sep. 6, 2001

(30) Foreign Application Priority Data

Mar. 3, 2000 (JP) ........................................ 2000-058350

(51) Int. Cl.[7] .............................................. H04B 10/12
(52) U.S. Cl. ........................ 398/149; 398/158; 398/193; 398/195
(58) Field of Search ................................ 398/192–199, 398/147, 149, 158, 162, 340–341.5

(56) References Cited

U.S. PATENT DOCUMENTS

| | | | | | |
|---|---|---|---|---|---|
| 4,945,531 | A | * | 7/1990 | Suzuki | 398/91 |
| 5,387,992 | A | * | 2/1995 | Miyazaki et al. | 398/95 |
| 6,185,022 | B1 | | 2/2001 | Harasawa | 359/124 |

(List continued on next page.)

FOREIGN PATENT DOCUMENTS

| JP | A-11-103287 | 4/1999 |
|---|---|---|
| JP | A-11-212044 | 8/1999 |
| JP | A-11-224967 | 8/1999 |
| JP | A-2000-183818 | 6/2000 |

OTHER PUBLICATIONS

T. Takahashi, "Q–factor Monitoring Technology—Advanced Signal Quality Evaluation Method for Optical Communication–", Advantest Technical Report, Probo, 1997/No. 10, Mar. 1997 (English translation of pp. 19–22).
T. Naito, et al., "Active Gain Slope Compensation in Large Capacity, Long–Haul WDM Transmission System", 10th Optical Amplifiers and Their Applications, OAA'99, Jun. 9–11, 1999, Nara, Japan, Optical Society of America (Trends in Optics and Photonics TOPS vol. XXX—Optical Amplifiers and Their Applications, Jun. 9, 1999 (Figure 1).
H. Kasai, et al., Supervised by S. Shimada, "SDH Transmission", OHM Publishing Company, Sep. 20, 1993 (English translation of pp. 37–38, "3.2 Frame Structure of SDH".

*Primary Examiner*—M. R. Sedighian
*Assistant Examiner*—Agustin Bello
(74) *Attorney, Agent, or Firm*—Staas & Halsey LLP

(57) ABSTRACT

In a WDM optical communication system, at least one optical tunable filter is placed along an optical fiber provided as an optical transmission path between a transmitting station and a receiving station. The optical tunable filter has a controllable transmission factor versus wavelength characteristic. In the receiving station, the transmission characteristics (for example, optical signal to noise ratios and Q factors) for optical signals of different wavelengths propagated over the optical fiber are measured. The measurements are sent to the transmitting station. The transmitting station then properly controls both the amounts of pre-emphasis in the transmitting station and the wavelength characteristic of the optical filter on the basis of the measurements to thereby equalize the transmission characteristics for the optical signals. In this case, it is also possible to calculate the optimum proportion of allocation of control between the pre-emphasis control and the filter control and then perform the pre-emphasis control and the filter control according to the optimum proportion of allocation. In this control, the main controller may be either the transmitting station or the receiving station.

30 Claims, 26 Drawing Sheets

U.S. PATENT DOCUMENTS

| | | | |
|---|---|---|---|
| 6,212,229 B1 * | 4/2001 | Salinger | 375/224 |
| 6,219,176 B1 * | 4/2001 | Terahara | 359/341.1 |
| 6,229,631 B1 * | 5/2001 | Sato et al. | 398/30 |
| 6,236,487 B1 * | 5/2001 | Stephens | 398/160 |
| 6,310,703 B1 * | 10/2001 | Alavie et al. | 398/34 |
| 6,411,417 B1 * | 6/2002 | Roberts et al. | 398/177 |
| 6,580,531 B1 * | 6/2003 | Swanson et al. | 398/5 |
| 6,603,585 B2 * | 8/2003 | Manna et al. | 398/147 |

* cited by examiner

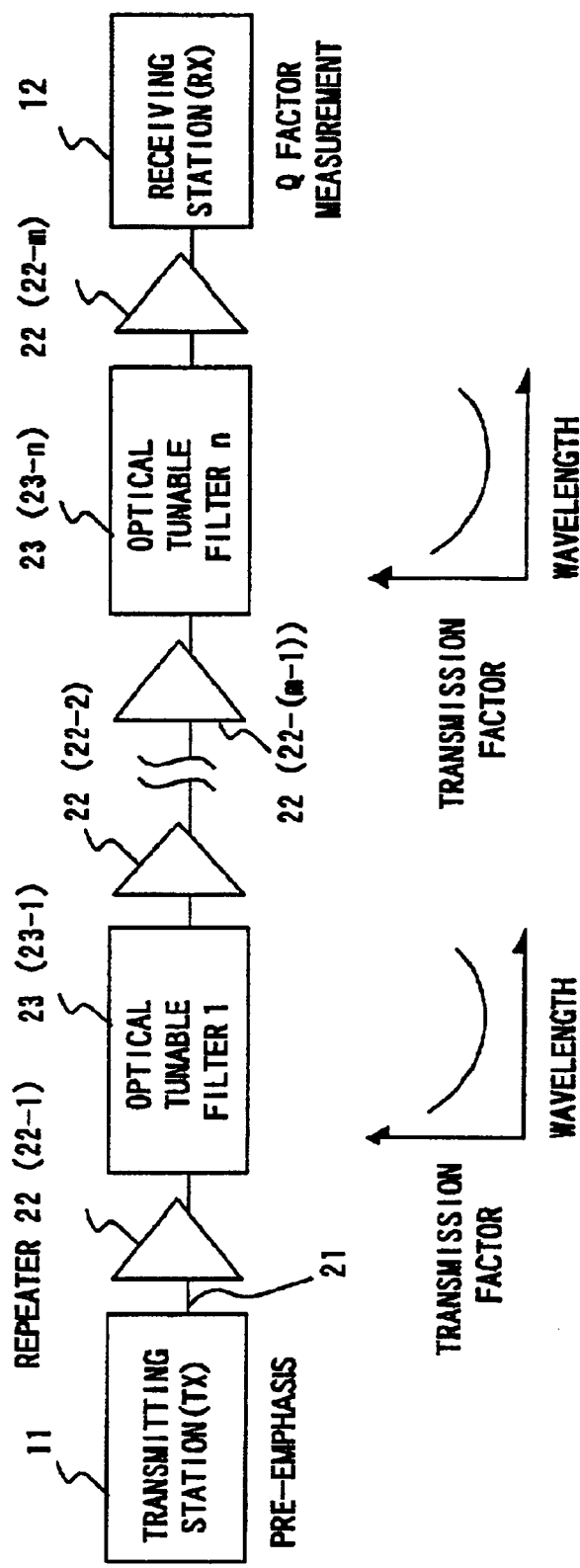
F I G. 1

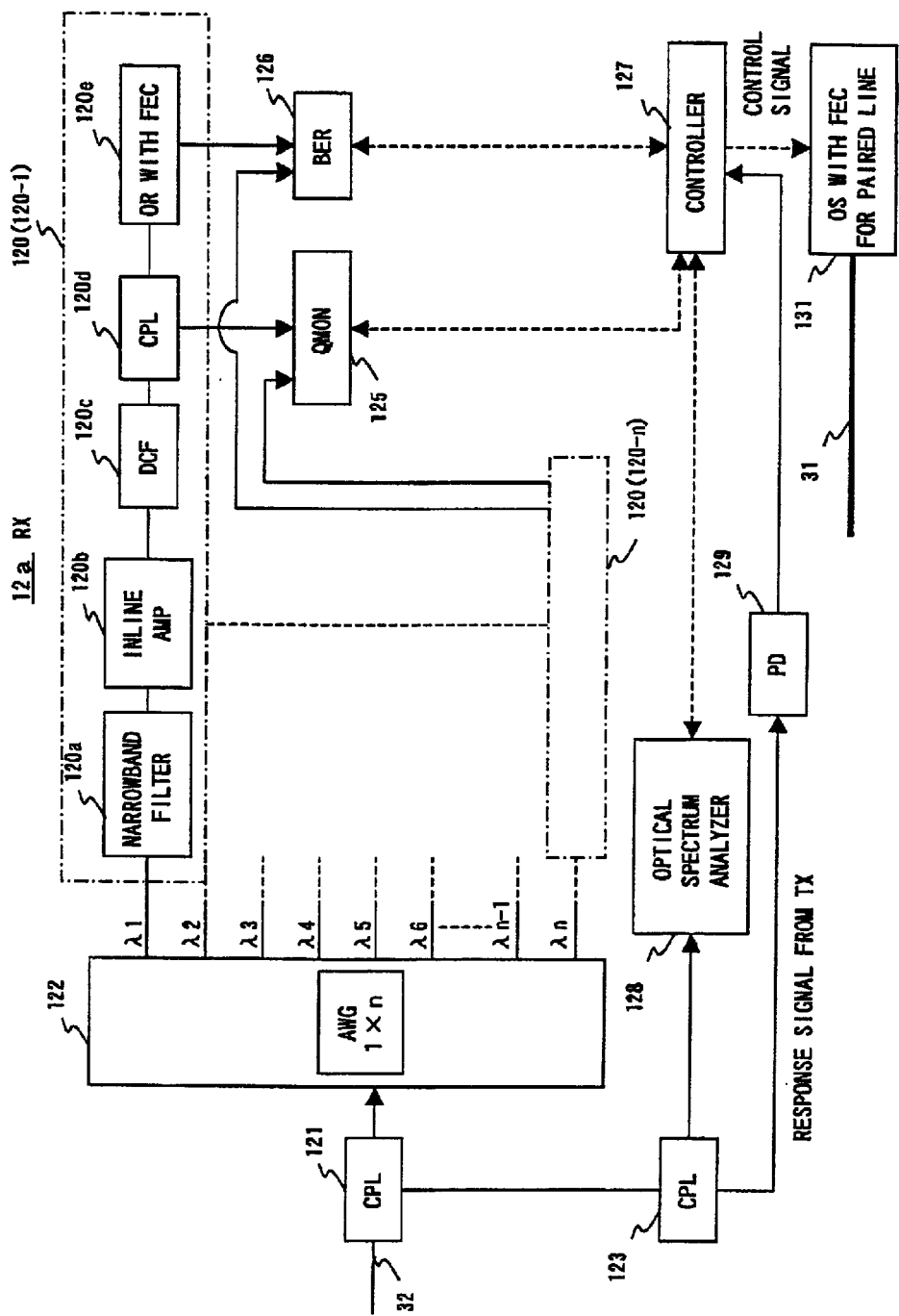
F I G. 6

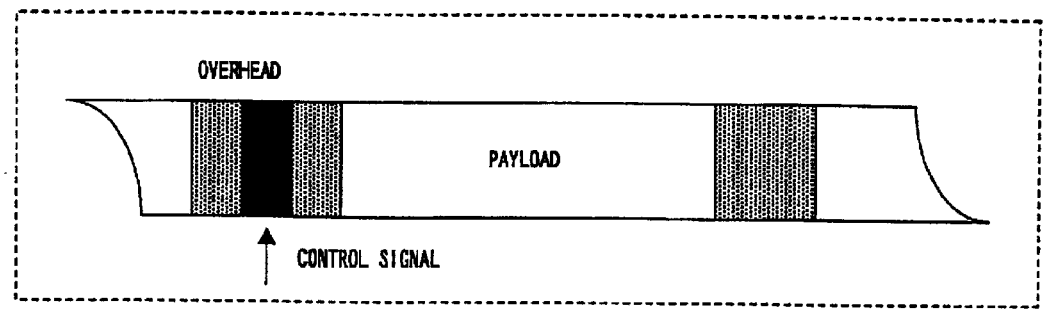
F I G. 7A
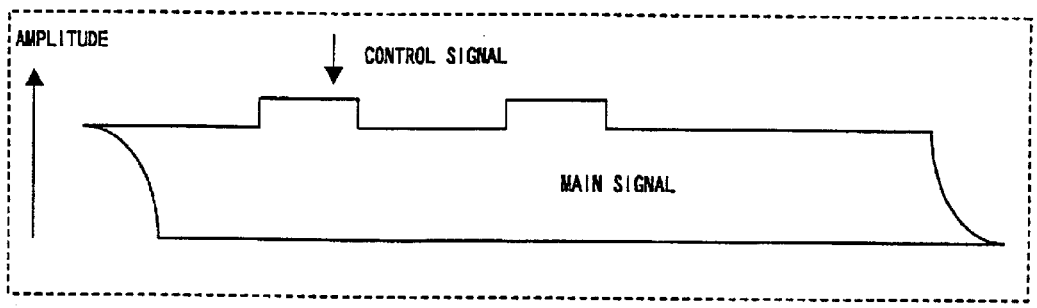
F I G. 7B
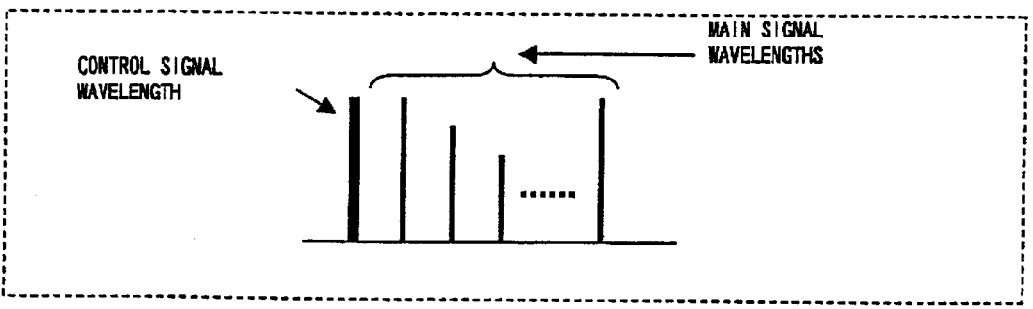
F I G. 7C

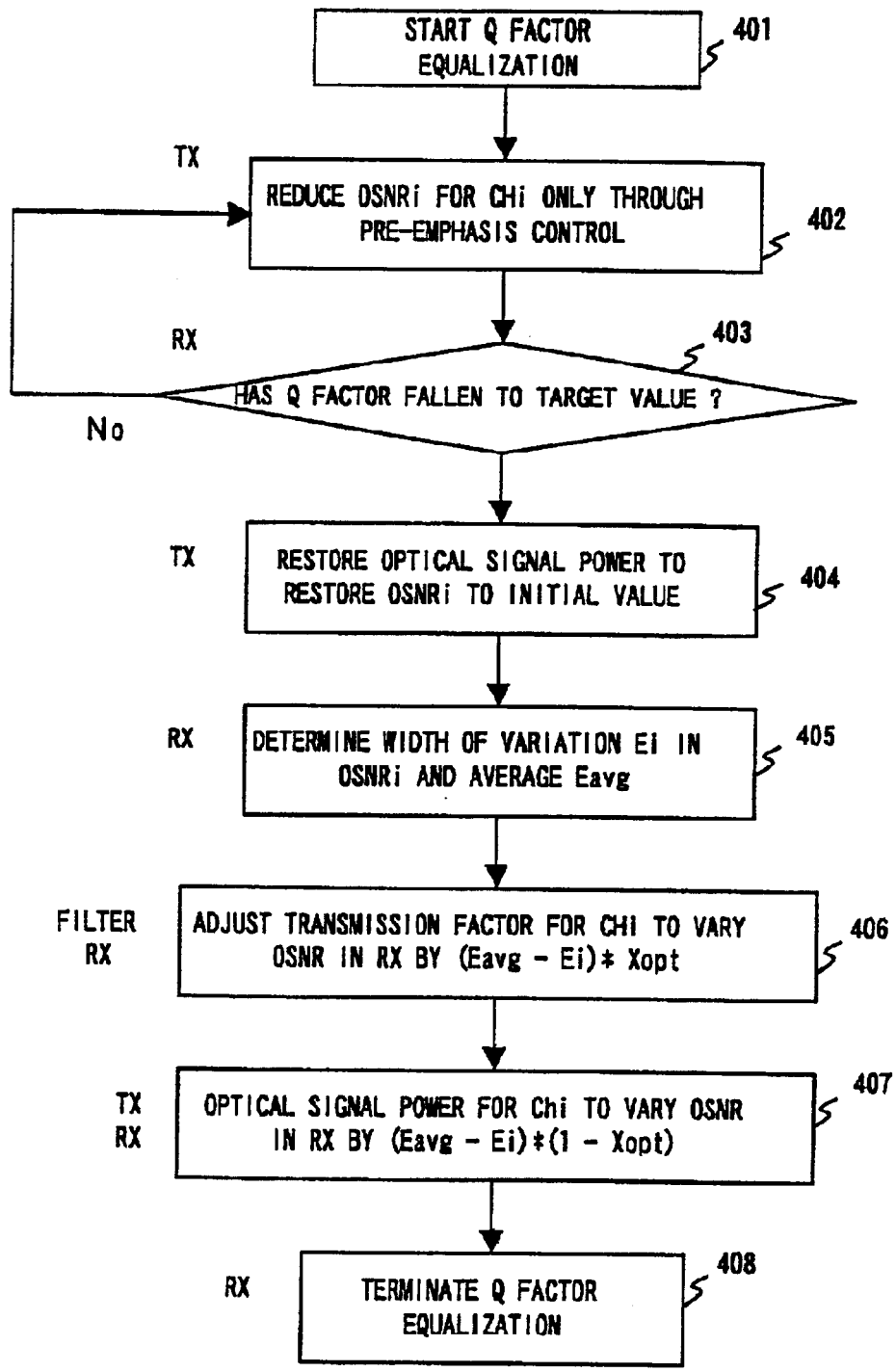
F I G. 11

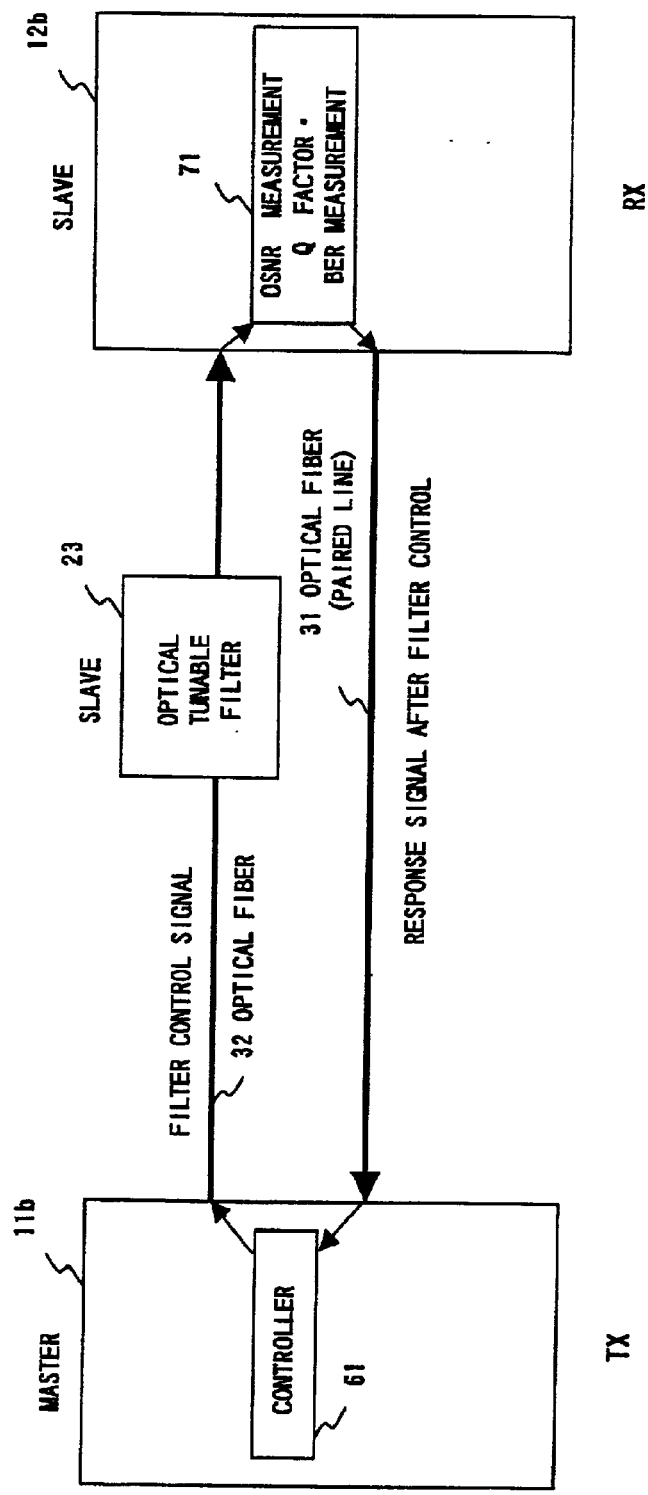
F I G. 1 5

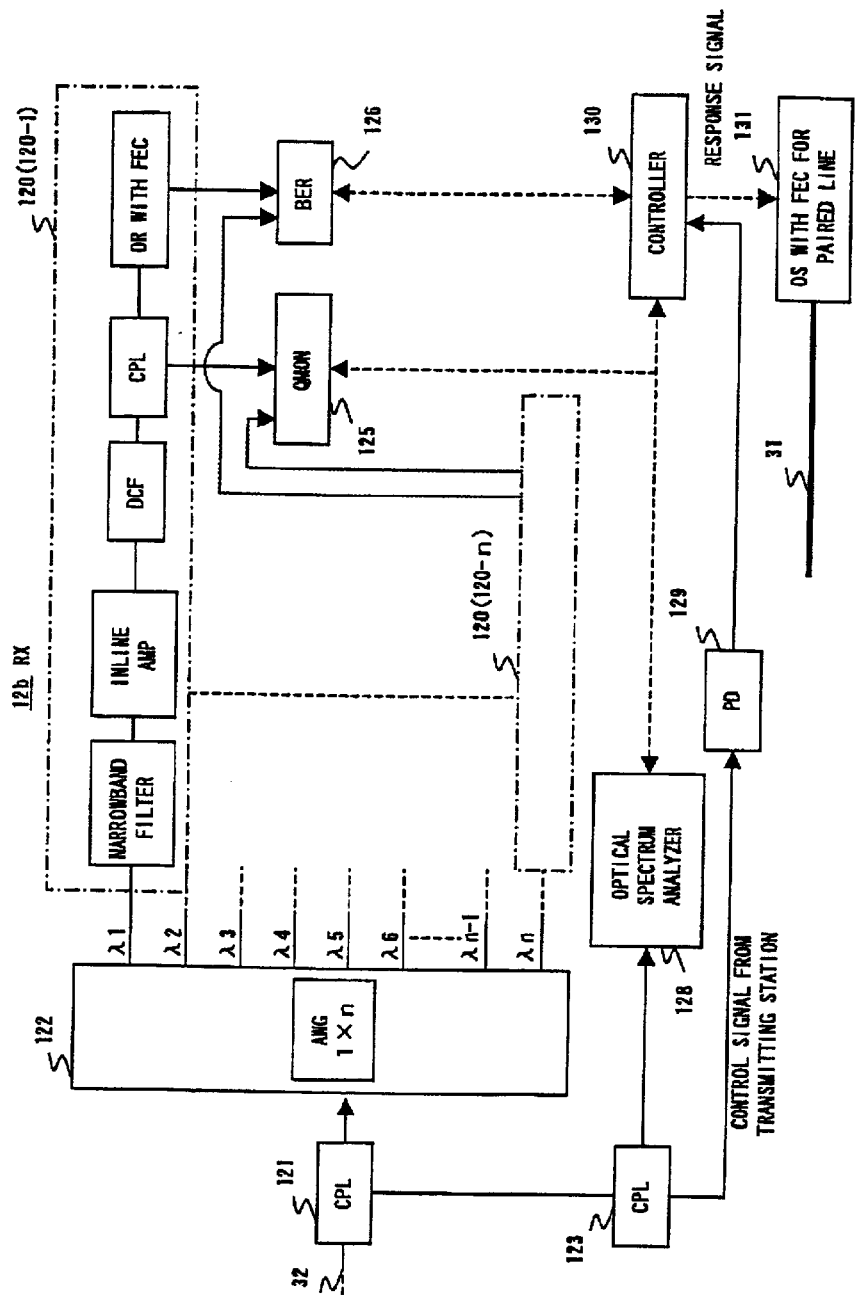
F I G. 17

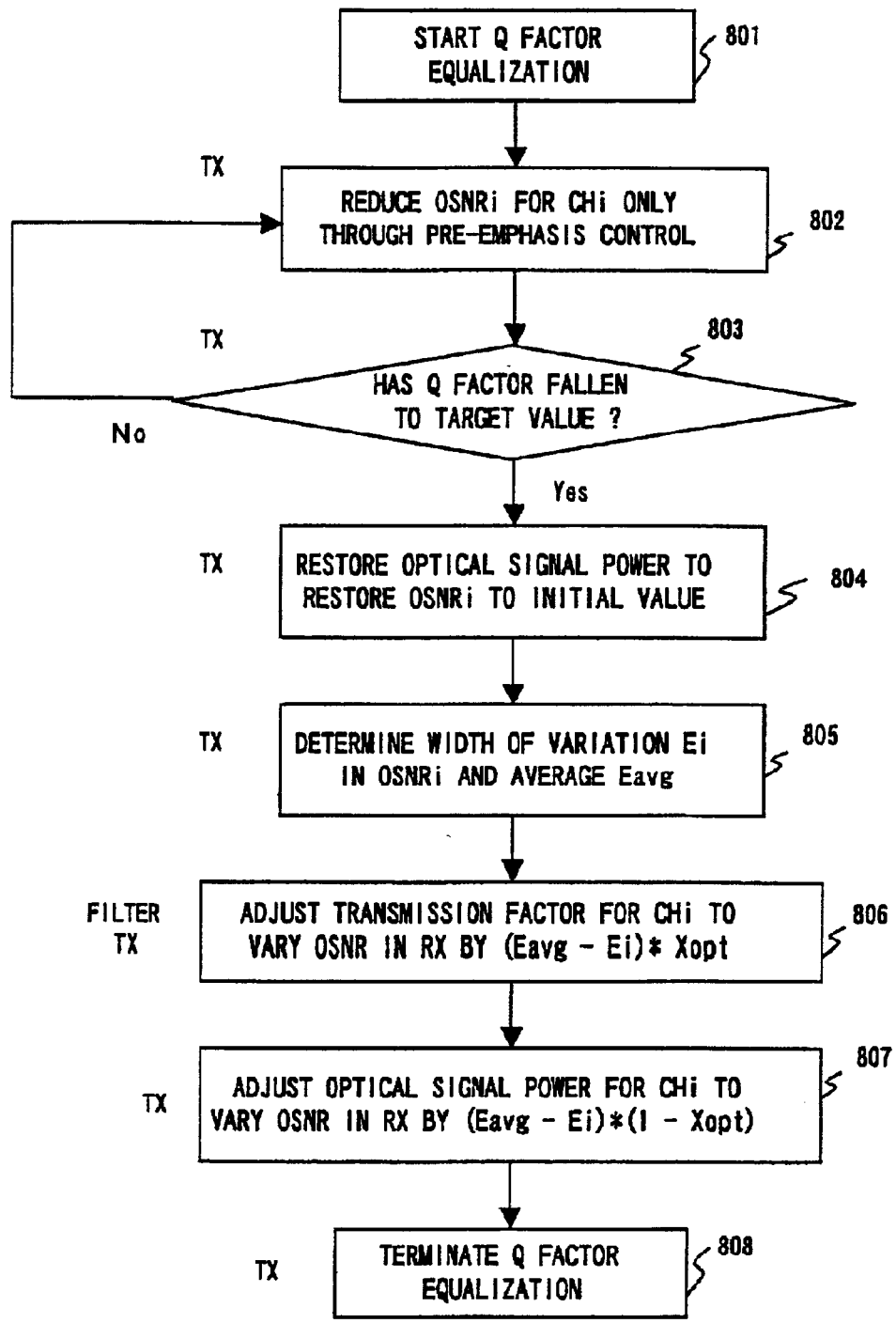
F I G. 2 1

SYSTEM AND METHOD FOR EQUALIZING TRANSMISSION CHARACTERISTICS IN WAVELENGTH DIVISION MULTIPLEXING OPTICAL COMMUNICATION SYSTEM

BACKGROUND OF THE INVENTION

1. Field of the Invention

The present invention relates to a system and method for equalizing and optimizing the transmission characteristics in wavelength division multiplexing optical communication systems.

2. Description of the Related Art

Many business companies are now beginning to adopt wavelength division multiplexing (WDM) as the core technology for high-speed networks. Wave division multiplexing is a technique which combines a plurality of carrier waves of different wavelengths, each modulated with a data signal, for simultaneous transmission over a single-core optical fiber cable and utilizes the property that optical beams of different wavelengths do not interfere with one another.

In optical communication systems using such WDM technology, the transmission characteristics are observed in terms of optical signal to noise ratios (OSNR: optical SN ratio) and Q factors.

Here, we explain the background of the introduction of the Q factors as a new evaluation index for the transmission characteristics. In recent years, international traffic has kept increasing with the increase in the capacity of communication networks typified by the Internet. With the rapid increase in traffic, optical submarine cables are actively being installed all over the world. Typical example of submarine cables are Pacific-Ocean submarine cables and Atlantic-Ocean submarine cables.

Recent optical submarine cable systems, unlike former systems, use erbium-doped fiber amplifiers (EDFA) to realize high-capacity long-haul communication with all-light relay and without any optoelectronic conversion. The EDFA-based relay system involves no retiming operation and requires only non-linear amplification for amplifying directly optical signals; thus, there is little to limit the communication speed, the degree of freedom can be increased, and the speed can be increased relatively easily. On the other hand, since no retiming operation is involved, the noise produced at each stage cannot be removed, which affects succeeding stages. For this reason, it is difficult to evaluate the reliability of optical communication systems based on optical amplification using EDFAs.

There is a slight increase in noise in each of the optical fiber amplifiers. Merely measuring the BER (Bit Error Rate), as was done before, is not sufficient to determine the degree of the effect. Therefore, measurement of the Q factor was proposed.

The Q factor is the signal to noise ratio in a digital signal, assuming that noise signals are Gaussian noise and represented by the signal amplitude ($\mu$) of the digital signal, and the effective Q factor ($\sigma$) of noise amplitude is as follows:

$$Q = Abs(\mu 1 - \mu 0)/(\sigma 1 + \sigma 0) \quad (1)$$

where Abs ($\mu 1 - \mu 0$) is the absolute value of $\mu 1 - \mu 0$.

In the wavelength division multiplexing optical communication system, it is desirable that the transmission characteristics be equalized for all channels. In real systems, however, degradation of the transmission characteristics varies from channel to channel. Thus, even if transmissions are made from the transmitting station using the same power for all channels, the power received by the receiving station varies from channel to channel and the same transmission characteristic is not maintained for all channels. In addition, the transmission characteristics vary with time as well. For this reason, it is required to perform pre-emphasis processing in the transmitting station. Pre-emphasis processing is an operation in the transmitting station of controlling the power of a optical signal to be transmitted for each channel so that, in the receiving station, the signal to noise ratio (SNR) becomes the same for all channels.

In prior art techniques, equalizing the transmission characteristics depends greatly on the pre-emphasis processing in the terminal station. However, the amounts of pre-emphasis have an upper limiting value (the difference between the maximum optical signal power and the minimum optical signal power allowed for pre-emphasis). When the upper limiting value is exceeded, there arises the possibility of degradation in the transmission characteristics due to a non-linear effect and degradation in OSNR in the terminal station. Thus, in order to ensure that the system transmission characteristics above are a fixed criterion, it is required to set up very stringent criteria in the design of repeaters and the like.

Particularly, as in submarine optical fiber communication systems, and in systems expected to experience increases in transmission distance and speed in the future, it is anticipated that limitations in the amounts of pre-emphasis and design criteria of repeaters will become increasingly strict and mere conventional pre-emphasis based transmission characteristic equalization control will not be able to achieve the performance required of the systems In each repeater, the gain is equalized by EDF (erbium-doped fiber) and LPG (long-period grating). However, the gain cannot be equalized perfectly due to manufacturing errors of EDF and LPG. It is therefore required to equalize the gain by subjecting the transmission factor versus wavelength characteristic to variable control every ten repeaters. However, such variable control has heretofore not been performed; instead, a selection is made from a plurality of previously prepared optical filters, each with a fixed transmission factor versus wavelength characteristic. With such a system, however, it is not impossible to equalize the gain with flexibility.

Recently, it has been shown that the equalization of transmission characteristics using variable filters and pre-emphasis in combination provides transmission characteristics of better quality than the equalization of transmission characteristics based on pre-emphasis only (see T. Naito et al., "Active Gain Slope Compensation in Large-Capacity, Long-Haul WDM transmission System", 10-th Optical Amplifiers and Their Applications, WC5-3, 1999).

SUMMARY OF THE INVENTION

It is therefore an object of the present invention to provide a transmission characteristic equalizing system and method for use in WDM optical communication systems which, while alleviating the burden on pre-emphasis control, permit the transmission characteristics for all channels to be equalized and optimized effectively and for a better transmission quality to be realized.

The transmission characteristic equalizing system of the invention is applied to WDM optical communication systems and includes at least an optical tunable filter, a transmission characteristic measurement unit, and a transmission characteristic control unit.

The optical tunable filter has a controllable transmission factor versus wavelength characteristic and is placed along an optical transmission path between a transmitting station and a receiving station. More than one optical tunable filter may be placed as required. For example, in an optical communication system in which an optical transmission path is laid over a very long distance and a number of repeaters is placed along that transmission path, it is desirable to place one optical filter every several repeaters.

The transmission characteristic measurement unit measures the transmission characteristics for optical signals of different wavelengths propagated over the optical transmission path and may be placed at any point where measurements of the transmission characteristics can be made. In principle, it may be placed in a repeater. In view of ease-of-control and measurement accuracy, it is most desirable to place the measurement unit in the receiving station.

The transmission characteristic control unit controls both the pre-emphasis in the transmitting station and the transmission factor versus wavelength characteristic of the optical tunable filter on the basis of measurements by the transmission characteristic measurement unit so as to equalize the transmission characteristics. It may be placed at any point where control signals can be sent to the transmitting station and the optical tunable filter, but preferably it should be placed in either the transmitting station or the receiving station. For example, when the transmission characteristic control unit is placed in the transmitting station, it is possible to perform control in such a way that the transmitting station exercises control over the receiving station and the optical tunable filter. On the other hand, when the transmission characteristic control unit is placed in the receiving station, the receiving station exercises control over the transmitting station and the optical tunable filter.

According to the transmission characteristic equalizing system of the invention thus configured, since not only the pre-emphasis in the transmitting station and the wavelength characteristic of the optical tunable filter placed along the optical transmission path is controlled, the burden which has been hitherto imposed on only the pre-emphasis control in equalizing the transmission characteristics is effectively alleviated. In addition, it becomes possible to provide transmission characteristics of better quality than with pre-emphasis control only.

Hereinafter, the preferred embodiments of the transmission characteristic equalizing system of the invention and more specific embodiments will be described.

(1) The transmission characteristic control unit, in equalizing the transmission characteristics, precalculates the optimum allocation of control between the controlled variable of the pre-emphasis and the controlled variable of the wavelength characteristic of the optical tunable filter (i.e., the allocation that allows pre-emphasis control and the wavelength characteristic control to be carried out most effectively) and controls the pre-emphasis and the wavelength characteristic according to the optimum allocation. By doing so, not only can the transmission characteristics be equalized, but also, the optimum transmission characteristics can be obtained.

(2) To calculate the optimum allocation in (1), the transmission characteristic control unit first controls only the transmission factor versus wavelength characteristic of the optical tunable filter to temporarily equalize the transmission characteristics and then calculates the optimum allocation with reference to the transmission factor versus wavelength characteristic of the optical tunable filter at the time of temporary equalization of the transmission characteristics.

As an alternative to this, the transmission characteristic control unit may first control only the amounts of pre-emphasis in the transmitting station to temporarily equalize the transmission characteristics and then calculate the optimum allocation with reference to the amounts of pre-emphasis at the time of temporary equalization of the transmission characteristics.

(3) As specific means for equalization and optimization in (2), the transmission characteristic measurement unit measures first and second transmission characteristic values having a correlation as the transmission characteristics, and the transmission characteristic control unit first controls only the transmission factor versus wavelength characteristic of the optical tunable filter to equalize the first transmission characteristic values and then temporarily equalize the second transmission characteristic values with reference to the equalized first transmission characteristic values, then calculates the optimum allocation with reference to the transmission factor versus wavelength characteristic of the optical tunable filter at the time of temporary equalization of the second transmission characteristic values, and controls both the transmission factor versus wavelength characteristic of the optical tunable filter and the amounts of pre-emphasis in the transmitting station according to the optimum allocation to thereby equalize the second transmission characteristic values.

(4) In (2), the process of controlling only the transmission factor versus wavelength characteristic of the optical tunable filter to temporarily equalize the second transmission characteristic values may be performed by reducing the transmission factor of the optical tunable filter for each wavelength to decrease the first transmission characteristic values and thereby lower the second transmission characteristic values to a given target value, restoring the transmission factor of the optical tunable filter to its original value to restore the first transmission characteristic values to their initial values, determining the widths of variation of the first transmission characteristic values at that point, determining the average of the widths of variation of the first transmission characteristic values over all wavelengths, and adjusting the transmission factor of the optical tunable filter for each wavelength to vary each of the first transmission characteristic values by the difference between the average and the corresponding width of variation.

(5) In (3), the process of calculating the optimum allocation may be performed, assuming that the transmission factors of the optical tunable filter to which reference is made are 100%, by controlling the amounts of pre-emphasis in the transmitting station to equalize the second transmission characteristic values each time the transmission factors of the filter are reduced by a percentage, calculating the average of the equalized second transmission characteristic values over all wavelengths each time the transmission factors of the filter are reduced by the percentage, and using the percentage of a reduction in the transmission factors when the average is a maximum as the optimum allocation.

(6) In (5), the process of controlling the amounts of pre-emphasis in the transmitting station to equalize the second transmission characteristic values may be performed by controlling the amounts of pre-emphasis to equalize the first transmission characteristic values, adjusting the amounts of pre-emphasis for each wavelength to decrease the first transmission characteristic values and thereby temporarily lower the second transmission characteristic values to a given target value, restoring the amounts of pre-emphasis to their original values to restore the first transmission characteristic values to their initial values, determining the widths of variation of the first transmission characteristic values at that point, determining the average of the widths of variation of the first transmission characteristic values for all wavelengths, and adjusting the amount of pre-emphasis for each wavelength to vary each of the first transmission characteristic values by the difference between the average and the corresponding width of variation.

(7) In (3) through (6), it is desirable that the transmission characteristic control unit calculate the optimum allocation prior to start of the operation of the communication system and control the amounts of pre-emphasis and the transmission factor versus wavelength characteristic according to the optimum allocation during the operation of the communication system to thereby equalize and optimize the transmission characteristics for all wavelengths.

(8) In (7), the process of controlling the amounts of pre-emphasis and the transmission factor versus wavelength characteristic according to the optimum allocation during the operation of the communication system may be performed by adjusting the amount of pre-emphasis or the transmission factor for each wavelength to decrease the first transmission characteristic values and thereby temporarily lower the second transmission characteristic values to a given target value, restoring the amount of pre-emphasis or the transmission factor to their original values to restore the first transmission characteristic values to their initial values, determining the widths of variation of the first transmission characteristic values at that point, determining the average of the widths of variation of the first transmission characteristic values over all wavelengths, adjusting the transmission factor for each wavelength to vary the first transmission characteristic values by an amount corresponding to the optimum allocation, and adjusting the amount of pre-emphasis for each wavelength to further vary the first transmission characteristic values by an amount corresponding to the optimum allocation.

(9) In (8), assuming the ratio representing the optimum allocation between a controlled variable of the transmission factor versus wavelength characteristic and a controlled variable of the amounts of pre-emphasis to be X to 1−X, a variation in the first transmission characteristic values by control of the wavelength characteristic according to the optimum allocation is the product of the difference and X, and a variation in the first transmission characteristic values by control of the amounts of pre-emphasis according to the optimum allocation is the product of the difference and 1−X.

(10) The given target value may be the minimum value of the second transmission characteristic values specified by the communication system.

(11) The first transmission characteristic values may be optical signal to noise ratios (OSNR), and the second transmission characteristic values may be Q factors. Otherwise, the first transmission characteristic values may be optical signal to noise ratios (OSNR), and the second transmission characteristic values may be bit error rates (BER).

(12) The amounts of pre-emphasis in the transmitting station and the transmission factor versus wavelength characteristic of the optical tunable filter can be controlled via one of the following such signals: an overhead signal, a control signal superimposed on a main signal amplitude, and a dedicated control signal.

The transmission characteristic equalizing method of the invention, which is applied to WDM optical communication systems, comprises:

(a) placing at least one optical tunable filter having a variable transmission factor versus wavelength characteristic along an optical transmission path between a transmitting station and a receiving station;

(b) measuring the transmission characteristics of optical signals of different wavelengths transmitted over the optical transmission path; and (c) controlling, on the basis of the measurements of the transmission characteristic, the amounts of pre-emphasis in the transmitting station and the transmission factor versus wavelength characteristic of the optical tunable filter to thereby equalize the transmission characteristics for the optical signals.

The transmission characteristic equalizing method can provide the same workings and advantages as the above-described transmission characteristic equalizing system. In addition, the same embodiments and examples of the system may be applied to the method.

BRIEF DESCRIPTION OF THE DRAWINGS

FIG. 1 shows a configuration of a WDM optical communication system to which the invention is applied;

FIG. 6 shows an arrangement of the receiving station in the first embodiment of the invention;

FIGS. 7A, 7B and 7C show examples of formats which can be used in transmitting a control signal, specifically, FIG. 7A shows an example in which the control signal is transmitted contained in an overhead, FIG. 7B shows an example in which the control signal is transmitted superimposed on the amplitude of a main signal, and FIG. 7C shows an example in which a dedicated control signal wavelength is transmitted independent of main signal wavelengths;

FIG. 11 is a flowchart for the algorithm of control operation (Q equalization during the system operation) in the first embodiment of the invention;

FIG. 15 is a conceptual diagram of the overall operation of the second embodiment of the invention, and is of particular use in explaining the operation of the transmitting station to control an optical tunable filter;

FIG. 17 shows an arrangement of the receiving station in the second embodiment of the invention;

FIG. 21 is a flowchart for the algorithm of control operation (Q equalization during the system operation) in the second embodiment of the invention;

DESCRIPTION OF THE PREFERRED EMBODIMENTS

The overall configuration of a WDM optical communication system to which a first embodiment is applied is illustrated in FIG. 1.

As shown in the diagram, the system is configured such that a transmitting station (TX) 11 and a receiving station (RX) 12 are provided as terminal stations, and an optical fiber 21 as an optical transmitting path, and m repeaters 22 (22-1 to 22-m) and n optical tunable filters 23 (23-1 to 23-n) are placed between the transmitting and receiving stations 11 and 12.

Each of the optical tunable filters 23 is a filter whose transmission factor versus wavelength characteristic can be controlled variably. An example of such a characteristic of the optical tunable filters is illustrated below the filters 23-1 and 23-n. The transmission factor versus wavelength characteristic of each of the n optical tunable filters 23 is controlled identically. As the optical tunable filters 23, use may be made of acousto-optic tunable filters (AOTF), optical tunable filters that employ the magneto-optical effect (variable Faraday rotator) and the polarization characteristic of an optical film, etc.

[First Embodiment]

Figure 2:
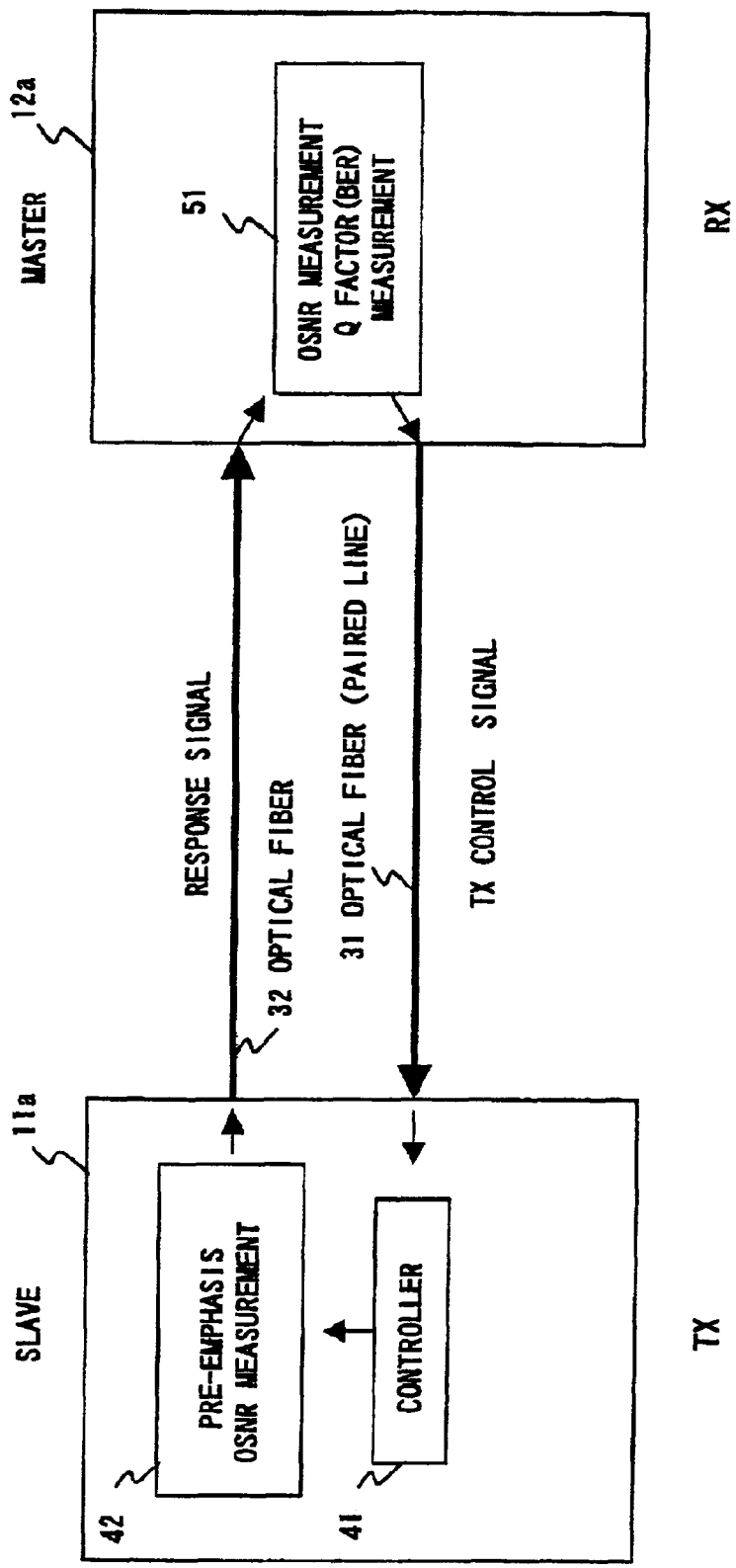
FIG. 2 is a conceptual diagram of the overall operation of a first embodiment of the invention, and is of particular use in explaining the operation of a transmitting station to control a receiving station.
Figure 3:
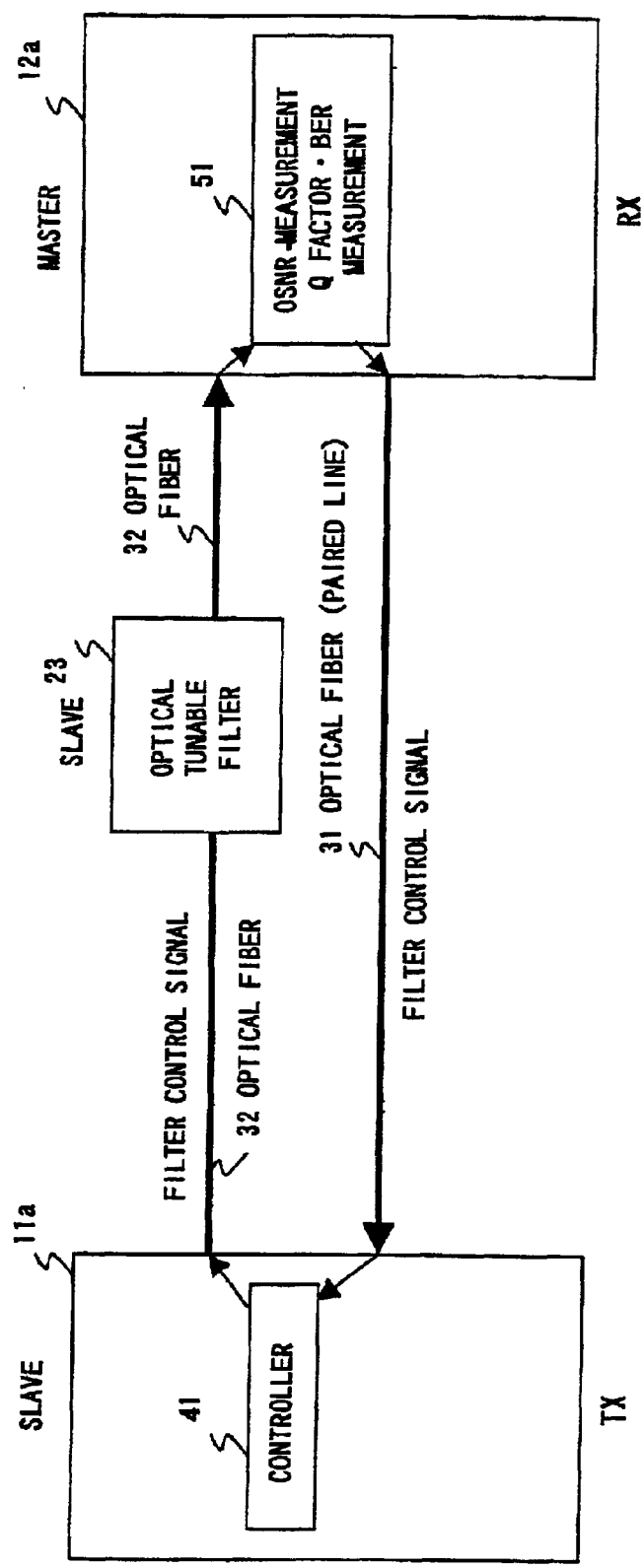
FIG. 3 is a conceptual diagram of the overall operation of the first embodiment of the invention, and is of particular use in explaining the operation of the transmitting station to control an optical tunable filter.

FIGS. 2 and 3 are schematic conceptual diagrams for use in explaining the overall operation of a first embodiment of the invention applied to the system of FIG. 1. More specifically, FIG. 2 is a diagram for use in explaining the operation of a receiving station 12a to control the pre-emphasis in a transmitting station 11a and FIG. 3 is a diagram for use in explaining the operation of the receiving station 12a to control the optical tunable filters 23 via the transmitting station 11. In the first embodiment, the receiving station 12a serves as the master station, while the transmitting station 11a serves as the slave station. Note that the optical filters 23 are omitted in FIG. 2. Each of the control operations will be described briefly below.

(A) Control of the pre-emphasis in the transmitting station (FIG. 2)

The receiving station 12a has a measurement section 51 that functions as a transmission characteristic measurement unit and a transmission characteristic control unit. The measurement section measures and analyzes the OSNR and Q factor of a received optical signal and then, based on the results, sends a pre-emphasis control signal over an optical fiber 31 (paired line) to the transmitting station 11a so that variations in the OSNR and Q factor are eliminated.

As the pre-emphasis control signal, use may be made of an overhead signal as shown in FIG. 7A by way of example. The signal shown in FIG. 7A has a frame format of synchronous transport module level n (STM-n) (n=1, 4, 16, 64, . . . ) of a synchronous digital hierarchy (SDH). The overhead signal is section overhead (SOH). The payload following SOH is a field in which multiplexed information is carried.

Upon receipt of the pre-emphasis control signal, the transmitting station 11a performs pre-emphasis control in a pre-emphasis control section 42 under the control of a controller 41 and then sends a response signal over an optical fiber 3 to the receiving station 12a. The response signal is a signal related to the pre-emphasis control performed by the transmitting station 11a. To be specific, the signal contains information as to how the intensity of an optical signal from each channel has been set by way of example.

(B) Control of the transmission factor versus wavelength characteristic of the optical tunable filters (FIG. 3)

The receiving station 12a measures the OSNR and Q factor of a received signal in the measurement section 51 and then sends a filter control signal for the optical filter 23 over the optical fiber 31 to the transmitting station 11a so that variations in the OSNR and Q factor are eliminated. The transmitting station 11a sends the received filter control signal to the optical tunable filter 23 over the optical filter 32. In the optical tunable filter 23, its transmission factor versus wavelength characteristic is controlled. The filter control signal is also carried in the overhead as shown in FIG. 7A by way of example.

As described above, the transmission characteristics of the WDM optical communication system shown in FIG. 1 are homogenized and optimized by controlling the pre-emphasis characteristic of the transmitting station 11a and controlling the transmission factor versus wavelength characteristic of the optical tunable filter 21 on the basis of the measurements of the transmission characteristics (OSNR and Q factor) of received signals in the receiving station 12a. These control operations will be described in detail later.

The arrangements of the optical tunable filter 23, the transmitting station 11a, and the receiving station 12a will be described below with reference to FIGS. 4, 5, and 6.

Figure 4:
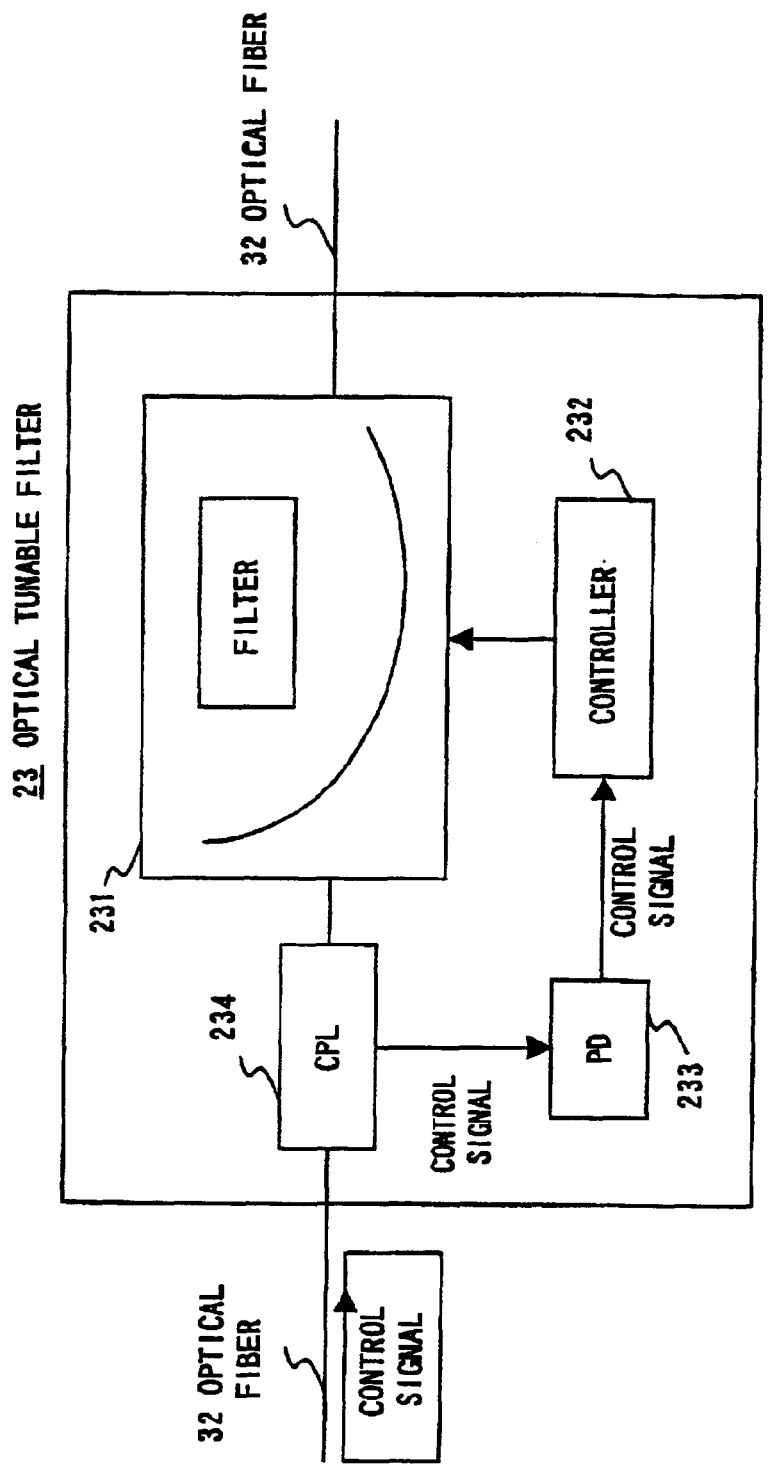
FIG. 4 shows an arrangement of the optical tunable filter in the first embodiment of the invention.

FIG. 4 shows an exemplary arrangement of the optical tunable filter 23 shown in FIG. 3.

The optical tunable filter is composed of a filter section 231, a controller 232, a photodiode (PD) 233, and an optical coupler (CPL) 234. The filter section 231 is a filter that has its transmission factor versus wavelength characteristic varied by the controller 232.

A filter control signal, together with a main signal, is sent from the transmitting station 11a to the optical tunable filter 23 over the optical fiber 32. The optical coupler 234, which is placed along the optical fiber 32, separates an optical signal sent over the optical fiber 32 into a main signal and a filter control signal, which in turn are output to the filter section 231 and the photodiode 233, respectively.

The photodiode 233 subjects the received filter control signal to opto-electrical conversion and then outputs the resulting electrical filter control signal to the controller 232, which in turn varies the transmission factor versus wavelength characteristic of the filter section 231 in accordance with the input filter control signal. The filter section 231 then outputs the received optical signal in accordance with the controlled transmission factor versus wavelength characteristic, which is then sent to the receiving station 12a over the optical fiber 32.

Figure 5:
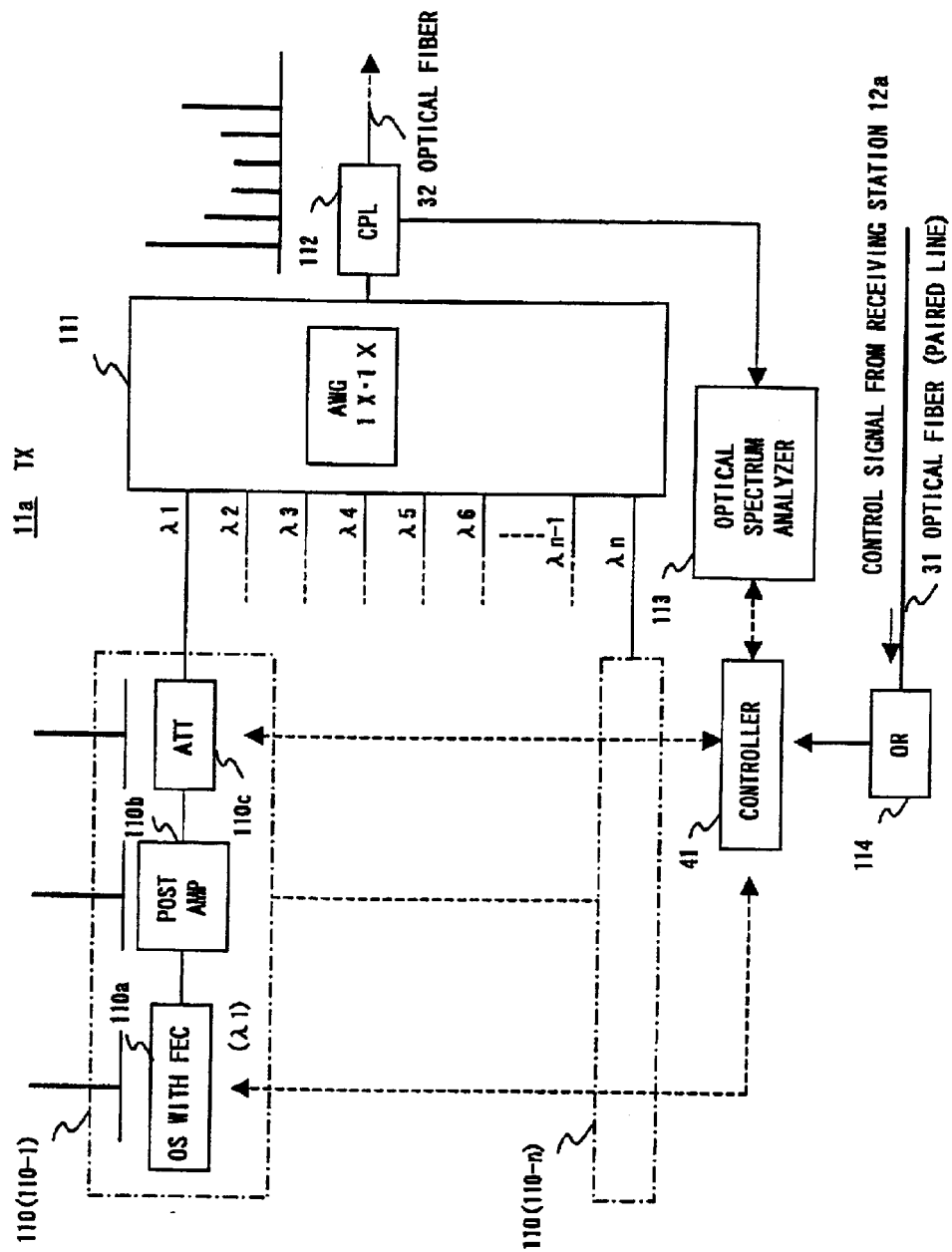
FIG. 5 shows an arrangement of the transmitting station in the first embodiment of the invention.

FIG. 5 shows an exemplary arrangement of the transmitting station 11a shown in FIGS. 2 and 3. In this arrangement, it is supposed that the transmitting station 11a multiplexes a number n of wavelengths ($\lambda 1$, $\lambda 2$, $\lambda 3$, . . . , $\lambda n$) for transmission over the optical fiber 32.

In FIG. 5, a block 110 (110-1) is arranged to produce an optical signal of wavelength $\lambda 1$, then perform pre-emphasis control on it and output the pre-emphasis-controlled optical signal to an arrayed waveguide grating (AWG) 111 and comprises an optical sender (OS) 110a with forward error correction (FEC), a post-amplifier (POST-AMP) 110b, and an attenuator (ATT) 110c.

More specifically, the optical sender 110a with FEC produces an optical signal of wavelength $\lambda 1$, then performs FEC on it and outputs the resulting signal to the post-amplifier 110b. The post-amplifier amplifies the optical signal of wavelength $\lambda 1$ and outputs it to the attenuator 110c. The attenuator reduces the intensity (power) of the input optical signal of wavelength $\lambda 1$ as instructed by the controller 41 and then outputs the intensity-controlled optical signal to the arrayed waveguide grating 111.

Though not shown in FIG. 5, there exists a total of n blocks 110 in correspondence with n wavelengths. That is, there are provided, in addition to the block 110-1, (n−1) blocks 110-2, 110-3, . . . , and 110-n, which produce optical signals of wavelengths $\lambda 2$, $\lambda 3$, . . . , $\lambda n$, respectively, each of which being sent to the AWG 111.

The AWG 111 multiplexes the optical signals of wavelengths $\lambda 1$, $\lambda 2$, . . . , $\lambda n$ from the blocks 110-1, 110-2, . . . , and 110-n and outputs the multiplexed optical signal to the optical coupler 112, which in turn sends the multiplexed optical signal over the optical fiber 32 and outputs its portion to an optical spectrum analyzer (OSA) 113 as well.

The spectrum analyzer 113 measures the intensity (power) and the OSNR of each of the optical signals of wavelengths $\lambda 1$, $\lambda 2$, . . . , $\lambda n$ from the transmitting station 11a on the basis of the wavelength division multiplexed optical signal from the optical coupler 112 and then outputs the measurements to the controller 41. The controller checks pre-emphasis controlling conditions and judges whether the pre-emphasis control has been terminated on the basis of the measurements from the analyzer. When judging that the pre-emphasis control has been terminated, the controller sends a response signal to the receiving station 12a over the optical fiber 32. The controller converts the intensity and the OSNR of each optical signal of wavelength $\lambda i$ obtained through the pre-emphasis control into control signals and then sends them to the receiving station 12a over the optical fiber 32. The pre-emphasis control by the controller 41 is carried out according to a pre-emphasis control signal sent from the receiving station 12a.

As described previously, the transmitting station 11a receives from the receiving station 12a two control signals: the pre-emphasis control signal and the filter control signal. An optical signal containing these control signals is sent over the optical fiber 31 and received by an optical receiver (OR) 114. The optical receiver outputs the received optical signal to the controller 41.

The controller 41 performs overhead (OH) processing on the optical signal sent from the receiving station 12a. That is, only the overhead signal is extracted from the optical signal of the format shown in FIG. 7A and then the pre-emphasis control signal and the filter control signal are extracted from the overhead signal.

In response to the pre-emphasis control signal, the controller 41 instructs each of the attenuators 110c to perform pre-emphasis control on a corresponding one of the optical signals of wavelengths $\lambda 1$, $\lambda 2$, . . . , $\lambda n$. On the other hand, the extracted filter control signal is sent added to the overhead as shown in FIG. 7A to the optical tunable filter 23 over the optical fiber 32 under the control of the controller 41. Thereby, the transmission factor versus wavelength characteristic of the optical filter 23 is controlled. In the present embodiment, as described previously, the pre-emphasis control and the filter control are carried out based on the control signals sent from the receiving station 12a. Accordingly, the receiving station is of primary importance and the transmitting station and the optical filter are of secondary importance.

FIG. 6 shows an exemplary arrangement of the receiving station 12a shown in FIGS. 2 and 3.

An optical coupler 121 outputs an optical signal received over the optical fiber 32 to an AWG 122 and a portion of the signal to another optical coupler 123. A multiplexed optical signal containing wavelengths $\lambda 1$, $\lambda 2$, . . . , $\lambda n$ is obtained from each of n output ports of the AWG 122 and then output to a corresponding one of n blocks 120 (120-1 to 120-n).

Each block 120 is arranged to separate a corresponding one of the optical signals of wavelengths $\lambda 1$, $\lambda 2$, . . . , $\lambda n$ from the multiplexed optical signal obtained from the corresponding output port of the AWG 122 and comprises a narrow band filter 120a, an in-line amplifier 120b, a dispersion compensation fiber (DCF) 120c, an optical coupler 120d, and an optical sender 120e with FEC.

The narrow band filter 120a is a filter that extracts an optical signal of target wavelength $\lambda i$ (i=1 to n) from the multiplexed optical signal input from the AWG 122. The in-line amplifier 120b amplifies the optical signal of wavelength $\lambda i$ from the narrow band filter 120a and the DCF 120c shapes the waveform of the amplified optical signal of wavelength $\lambda i$. The optical coupler 120d outputs the optical signal of wavelength $\lambda i$ to the optical sender 120e and outputs a portion of the optical signal to a Q factor monitor (QMON) 125. The optical sender converts the input optical signal of wavelength $\lambda i$ subjected to waveshaping into an electrical signal and then subjects it to forward error correction (FEC). The optical signal subjected to FEC is then output to a BER (Bit Error Rate) measurement device 126.

The Q factor monitor 125 measures the Q factor of the optical signal of wavelength $\lambda i$ from the optical coupler 120d and provides the measurement to a controller 127. The BER measurement device 126 measures the bit error rate of the optical signal of wavelength $\lambda i$ received by the optical receiver 120e and provides the measurement to the controller 127. The bit error rate can be measured readily by counting the number of error corrections by FEC.

The optical coupler 123 provides the optical signal from the optical coupler 121 to an optical spectrum analyzer 128 and a photodiode 129. The analyzer measures the power and OSNR of the input optical signal of wavelength λi and provides the measurements to the controller 127. The photodiode 129 converts the response signal sent from the transmitting station 11a and input from the optical coupler 123 into an electrical signal and delivers it to the controller 127.

Based on the Q factor (or the bit error rate) and the OSNR of the optical signal of wavelength λi input from the Q factor monitor 125, the BER measurement device 126, and the spectrum analyzer 18, the controller 127 computes the amount of pre-emphasis on the optical signal of wavelength λi performed by the transmitting station 11a and the transmission factor for the optical signal of wavelength λi in the optical tunable filter 21 so that the transmission characteristic of the optical signal of wavelength λi is homogenized and optimized.

Based on the computational results, the controller 127 produces control signals (a pre-emphasis control signal for controlling the amount of pre-emphasis for the optical signal of wavelength λi in the transmitting station 11a and a filter control signal for controlling the transmission factor versus wavelength characteristic of the optical tunable filter 23) and outputs them to an optical sender 131 with FEC associated with the paired line. That is, in the present embodiment, the measurement section 51 shown in FIG. 3 is constructed from the Q factor monitor 125, the BER measurement device 126 and the optical spectrum analyzer 128, and the controller 127. Further, the Q factor monitor 125, the BER measurement device 126, the optical spectrum analyzer 128 correspond to the transmission characteristic measurement means and the controller 127 corresponds to the transmission characteristic control means.

The optical sender 131 for the paired line sends the control signals from the controller 127 in the format shown in FIG. 7A to the transmitting station 11a over the paired-line optical fiber 31 using a built-in optical source such as a laser diode. In this case, overhead signal processing by which the control signals are contained in the overhead of the optical signal is performed before transmission. The optical sender 131 makes forward error corrections in sending the control signals.

Next, control for equalizing the transmission characteristics for all channels according to the present embodiment will be described in detail with reference to FIGS. 8 through 11. The following description is given by way of an example of the receiving station measuring the OSNR and Q factor as transmission characteristics and performing pre-emphasis control and filter control based on the measurements.

(a) First, prior to the start of the operation of the communication system, the Q factor equalization is performed by the optical tunable filter 23 only. The algorithm for the Q factor equalization in the entire system will be described with reference to FIG. 8.

(a-1) When the OSNR equalization is started (step 101), the OSNR is measured for each channel in the receiving station 12a, (i.e., for each wavelength) (step S102) and a decision is then made as to whether the difference between the maximum OSNR (OSNRmax) and the minimum OSNR (OSNRmin) is smaller than a given reference value (Δ) (step 103).

(a-2) If, in step 102, the difference between OSNRmax and OSNRmin is not smaller than the reference value (Δ), then the OSNR equalization is considered to be insufficient and the procedure goes to step 104-1 as a result. In step 104-1, the transmission factor Di for the i-th channel CHi is determined to calculate the transmission factor versus wavelength characteristic of the optical tunable filter 23. The transmission factor Di is calculated by $$Di=-(OSNRi-OSNRavg)/n \quad (2)$$

where OSNRi is the OSNR for channel DHi, OSNRavg is the average OSNR over all channels, and n is the number of the optical tunable filters 23 placed along the optical transmission path 21 shown in FIG. 1.

(a-3) The receiving station 12a produces a filter control signal, then sends it to the optical tunable filter 23 via the transmitting station 11a and controls the filter so that its transmission factor versus wavelength characteristic will match the transmission factor versus wavelength characteristic calculated in step 104-1 (step 104-2).

(a-4) After that, steps 102, 103, 104-1 and 104-2 are repeated. When, at a point, it is decided in step 103 that the difference between OSNRmax and OSNRmin has become smaller than the reference value (Δ), the OSNR equalization is considered to have terminated and the OSNRi of each channel at that point is stored (step S105).

(a-5) On termination of the OSNR equalization, the Q-factor equalization will be started (step 106). First, the receiving station 12a instructs the optical tunable filter 23 to reduce its transmission factor for one channel CHi to decrease the OSNRi (step 107).

(a-6) Subsequently, the receiving station 12a measures the Q factor (Qi factor) on channel CHi and then decides whether the Qi factor has fallen to a given target value through the operation in step 107 (step 108). As the target value, a minimum value specified by the system is used. As a result of the decision, if the Qi factor has not fallen to the target value, the operation in step 107 is repeated until it reaches the target value. When the target value is reached, the procedure goes to step 109.

(a-7) In step 109, the receiving station 12a instructs the optical tunable filter 23 to restore the transmission factor CHi to its original value so that OSNRi is restored to its initial value. At this point, the receiving station measures the OSNRi (this is put as Bi) at the time the Qi factor has fallen to the target value and determines the difference between Bi and the initial value of OSNRi, thereby calculating the width of variation, Ei, of OSNRi (step 110).

Figure 12:
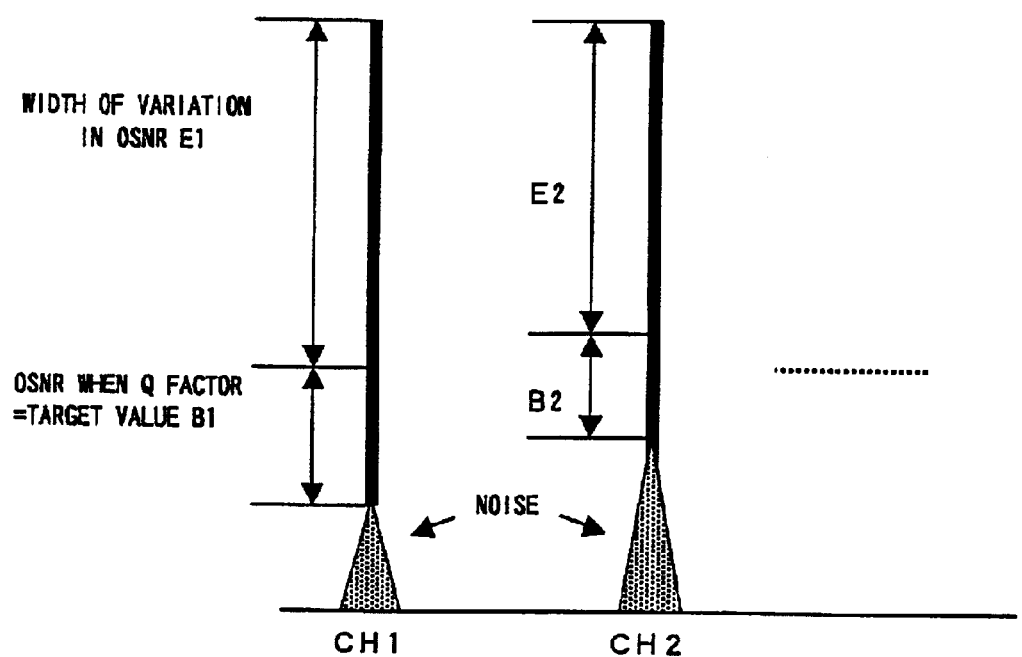
FIG. 12 is a schematic representation of the relationship between Bi on an actual signal waveform (OSNRi when the Qi value has fallen to a target value) and Ei (the width of variation in OSNRi)

The relationship between Bi and Ei on actual signal waveforms is schematically illustrated in FIG. 12. In the drawing, only two channels CH1 and CH2 (i.e., i=1, 2) are illustrated by way of example.

(a-8) In step 110, the width of variation Ei of OSNRi is determined for all channels by repeating step 107 and subsequent steps and the average Eavg of the widths of variation Ei is then calculated. Supposing the total number of channels to be m, the average Eavg is given by $$Eavg=(E1+E2+ \ldots +Em)/m \quad (3)$$

(a-9) In the subsequent step 111, the receiving station 12a determines the amount of OSNR, ΔEi, for each channel which is to be varied by the optical tunable filter 23. The amount of OSNR is calculated from the average Eavg and the width of variation Ei for each channel to be $$\Delta Ei=Eavg-Ei \quad (4)$$

The receiving station instructs the optical tunable filter 23 to adjust the transmission factor for each channel CHi, thereby varying the amount of OSNRi of each channel by ΔEi (=Eavg−Ei) from its initial value in the receiving station. That is, adjustments are made so that OSNRi=Bi+Eavg. Thereby, the Q factors for channels are equalized.

Figure 9:
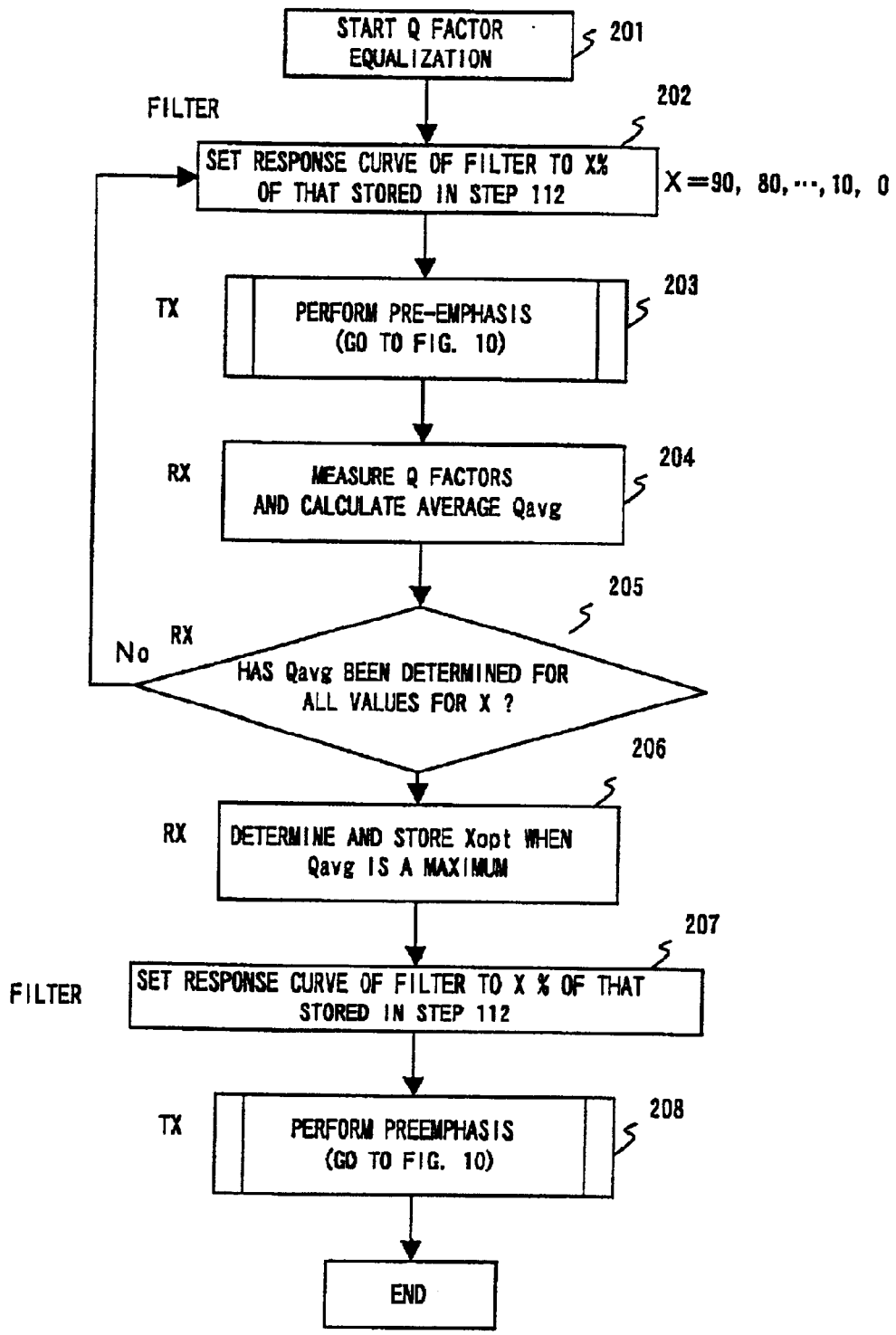
FIG. 9 is a flowchart for the algorithm of control operation (Q equalization using filters prior to the start of the system operation and pre-emphasis) in the first embodiment of the invention.

(a-10) The receiving station 12a stores the equalized wavelength characteristic (the wavelength response curve of the filter) finally obtained by adjusting the optical tunable filter 23 in step 111 and stores the final OSNRi for each channel, thereby terminating the Q-factor equalization through control of the optical tunable filter only (step 112). The stored equalized wavelength characteristic is used in subsequent operations (FIG. 9).

Figure 13:
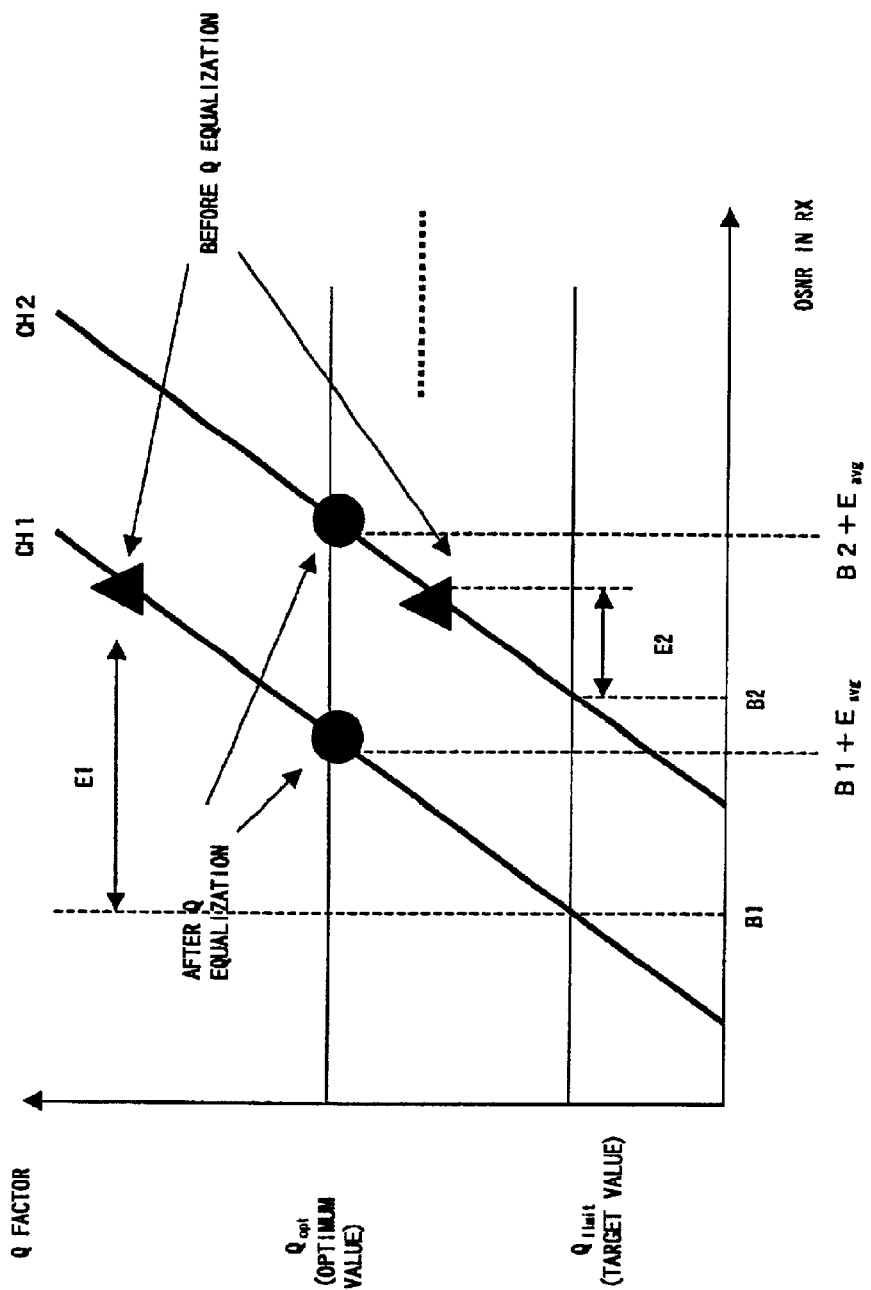
FIG. 13 is a schematic representation of the operation in steps 107 through 111 in FIG. 8.

The operations in steps 107 through 111 are illustrated schematically in FIG. 13. In the drawing, operations on only two channels CH1 and CH2 are illustrated by way of example; however, the same operations apply to other channels. These operations will be briefly described below.

The OSNR (optical signal to noise ratio) has been made substantially the same for all channels by the OSNR equalization processing in steps 101 through 105 described previously and thereby the initial value of the OSNR for each channel is set (values corresponding to black triangles).

After that, the OSNR is reduced until the Q factor reaches its target value (Qlimit) in steps 107 and 108. The OSNRs for channels CH1, Ch2, . . . , at this point are B1, B2, . . . , respectively.

The widths of variation of the OSNRs until the corresponding Q factors reach the target value are determined and their average Eavg is then calculated.

The OSNRs are varied by Eavg from B1, B2, . . . , and the Q factors are thereby equalized to the optimum value (Qopt) as indicated by black circles. The positions of black circles for channels CHi on the horizontal axis (OSNR) correspond to positions obtained by shifting the corresponding initial positions indicated by black triangles by Eavg−Ei.

(b) Upon termination of the Q factor equalization by the optical tunable filter 23 alone, the equalization and optimization of the Q factors based on both the optical tunable filter and the pre-emphasis processing are performed next. This processing is also performed prior to the start of the operation of the communication system. The algorithm for the overall system is described below with reference to FIG. 9.

(b-1) When the Q factor equalization is started (step 201), the receiving station 12a first instructs the optical tunable filter 23 to set its transmission factor versus wavelength characteristic (wavelength characteristic) to X % of the equalized wavelength characteristic (the wavelength response curve of the filter) stored in step 112 (FIG. 8) (step 202). That is, with the stored equalized wavelength characteristic as a curve of 100%, the wavelength characteristic of the filter is set to a curve of X % of the equalized wavelength characteristic. Here, X is set to any value less than 100, for example, 90, 80, . . . , 10, or 0. Steps 203 and 204 below are repeated for each value for X.

(b-2) The receiving station 12a instructs the transmitting station 11a to perform Q factor equalization based on pre-emphasis control only under the wavelength characteristic of the optical tunable filter 23 set in step 202 (step 203).

Figure 10:
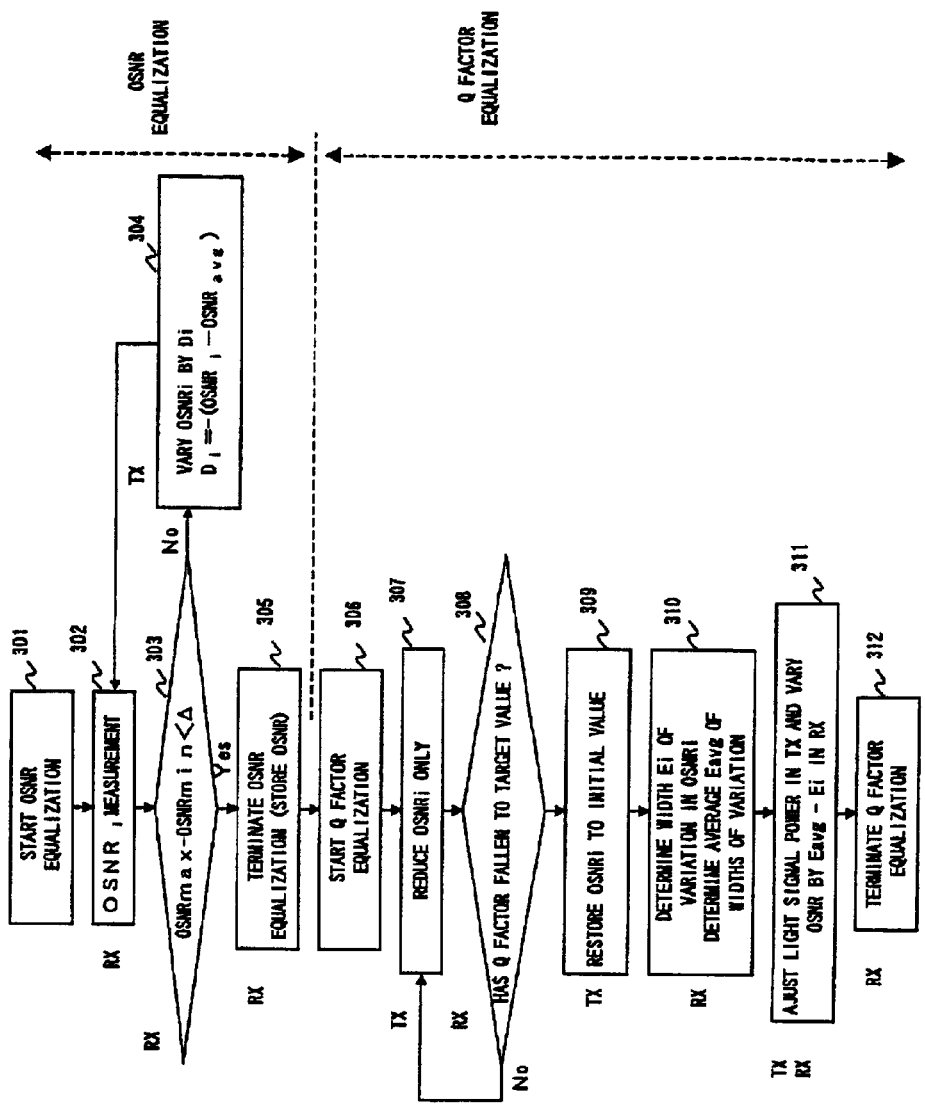
FIG. 10 is a detailed flowchart for the processing in steps 203 and 208 in FIG. 9 (Q equalization using pre-emphasis)

This operation is specifically illustrated in FIG. 10. Steps 301 through 312 remain basically unchanged from steps 101 through 112 shown in FIG. 8 except that the object of control is changed from the wavelength characteristic of the optical tunable filter 23 to the pre-emphasis processing in the transmitting station 11a. That is, in FIG. 10, instead of adjusting the transmission factor of the optical filter for each channel, in the transmitting station the power of each optical signal is adjusted to vary the OSNR and the Q factor for each channel. Thus, a detailed description of the flowchart of FIG. 10 is omitted.

(b-3) The receiving station 12a measures the Q factor obtained in step 203 for each channel, calculates the average Qavg over all channels, and stores it temporarily (step 204). A decision is then made as to whether the average Qavg has been determined for each of the values (say, 90, 80, . . . , 10, 0) for X set in step 202 (step 205). If they have not, steps 202, 203 and 204 are repeated until the average Qavg has been obtained for each of the values for X.

(b-4) The receiving station 12a determines the X value for the maximum average as the optimum value Xopt and stores it (step 206). The receiving station then instructs the optical tunable filter 23 to adjust its wavelength characteristic to Xopt % of the stored wavelength characteristic in step 112.

(b-5) Finally, the receiving station 12a instructs the transmitting station 11a to perform the Q factor equalization based on the pre-emphasis control only under the optimum wavelength characteristic of the optical tunable filter 23 set in step 206 (step 208). Thereby, the Q factor equalization processing to be performed prior to the start of the operation of the system comes to an end (step 209).

The operations in (a) and (b) described so far allow the wavelength characteristic of the optical tunable filter 23 and the attendant pre-emphasis characteristic to become optimized conditions of the transmission characteristic.

(c) During the operation of the communication system, the Q factors are equalized in accordance with the optimum proportion of allocation of control between the pre-emphasis control and the filter control determined prior to the start of the system operation in the above manner. Therefore the algorithm for the overall system will be described below with reference to FIG. 11.

(c-1) When the Q factor equalization is started in step 401, the receiving station 12a first instructs the transmitting station 11a to reduce the optical signal power for one channel CHi only by pre-emphasis control to decrease the corresponding OSNRi (steps 402 and 403). The Qi factor at this point is measured in the receiving station and a decision is then made as to whether the Qi factor has fallen to a given target value (step 403). If it has not, step 402 is repeated and the procedure proceeds to step 404 after the Qi factor has fallen to the target value. As the target value, the one used in step 108 (FIG. 8) is used.

(c-2) Instep 404, the receiving station 12a instructs the transmitting station 11a to restore the optical signal power for channel CHi to its original value in order to restore OSNRi to its initial value. At this point, the receiving station, as in step 110, measures OSNRi (=Bi) when the Q factor has fallen to the target value, determines the difference between OSNRi and the initial value to obtain the width of variation, Ei, of OSNRi, then determines the widths of variation, Ei, for all channels by repeating step 402 and subsequent steps for each channel, and calculates the average Eavg (step 405).

In steps 402 and 404, the optical signal power is varied for each channel in the transmitting station 11a; as an alternative to this approach, the transmission factor of the optical filter 23 may be varied for each channel.

(c-3) In subsequent step 406, the receiving station 12a determines the amount of OSNR, ΔEi (=Eavg−Ei), for each channel to be varied through both the filter control and the pre-emphasis control. The receiving station instructs the optical tunable filter to adjust the transmission factor for each channel so as to vary OSNRi in the receiving station for each channel by the product of ΔEi (=Eavg−Ei) and Xopt stored in step 206 from the corresponding initial value. In this case, Xopt is represented in a value less than one and more than zero, not in percent (%).

(c-4) In step 407, the receiving station 12a instructs the transmitting station 11a to adjust the optical signal power for each channel so as to further vary OSNRi for each channel CHi in the receiving station by the product of A Ei and (1−Xopt) obtained by subtracting Xopt from unity. Thus, the Q factor equalization during the operation of the communication system comes to an end (step 408).

That is, in steps 406 and 407, the Q factor equalization is performed while allocating control between the filter control and the pre-emphasis control in the proportion of Xop to 1−Xopt. The transmission characteristics can thus be equalized and optimized by carrying out the filter control and the pre-emphasis control in the optimum proportion.

[Second Embodiment]

Figure 14:
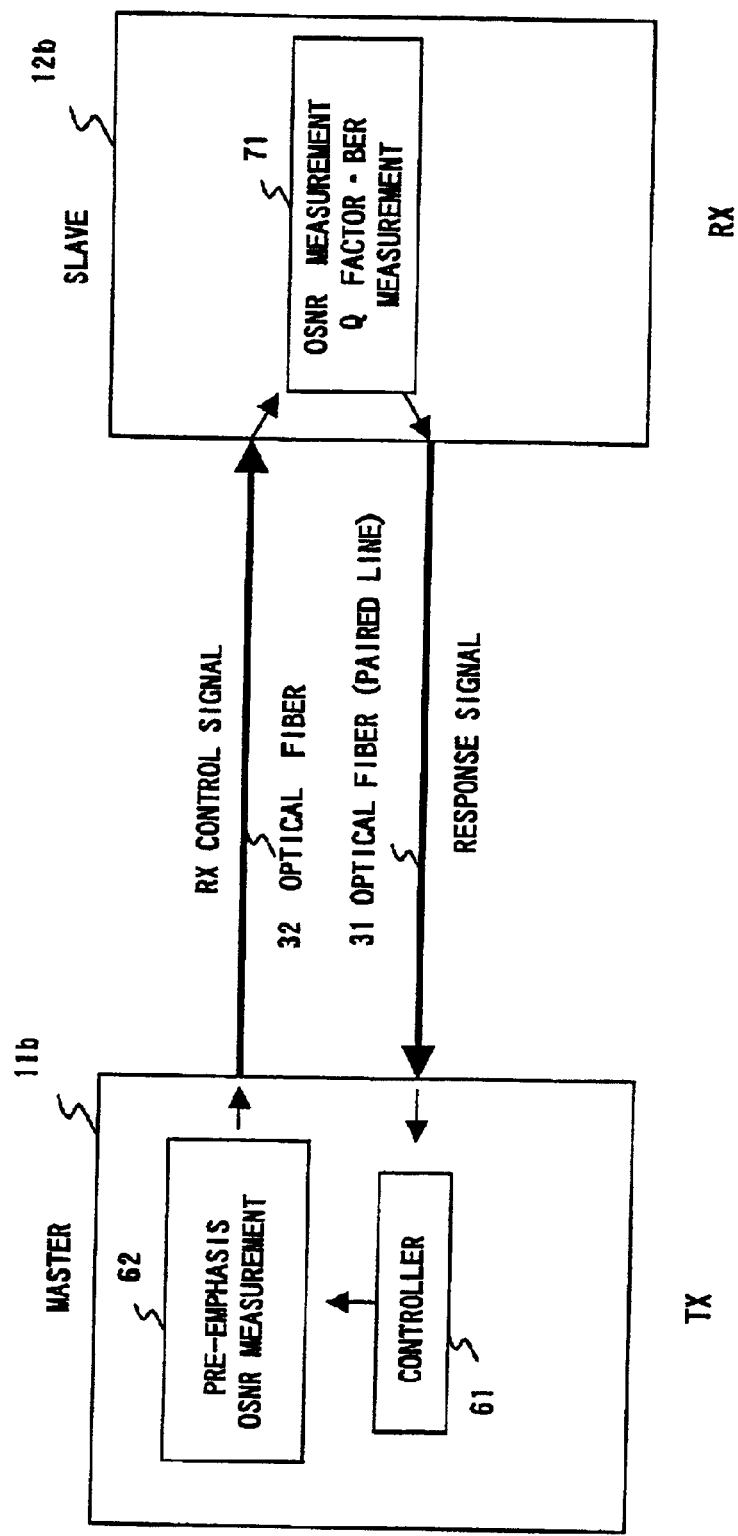
FIG. 14 is a conceptual diagram of the overall operation of a second embodiment of the invention, and is of particular use in explaining the operation of a transmitting station to control a receiving station.

FIGS. 14 and 15 are schematic diagrams for use in explaining the overall operation of a second embodiment of the present invention which is applied to the system of FIG. 1. More specifically, FIG. 14 is a diagram for use in explaining the operation of a transmitting station 11b to control a receiving station 12b and FIG. 15 is a diagram for use in explaining the operation of the transmitting station 11b to control an optical tunable filter 23. In FIG. 14, the optical tunable filter 23 is omitted. Hereinafter, each control operation will be described briefly.

(A) Pre-emphasis control in the transmitting station (FIG. 14)

The transmitting station 11b has a controller 61 and a pre-emphasis controller 62 serving as a transmission characteristic control unit and sends instructions to the receiving station 12b over an optical fiber 32 to measure OSNRs and Q factors and to send back the measurements.

The receiving station 12a has a measurement section 71 as a transmission characteristic measurement unit and, as instructed by the transmitting station 11b, measures the OSNRs and Q factors of received optical signals and sends back the measurements as a response signal to the transmitting station over an optical fiber 31 (paired line).

The transmitting station 11b analyzes the measurements sent from the receiving station 12b to control the pre-emphasis.

(B) Control of the wavelength characteristic of the optical tunable filter (FIG. 15)

The transmitting station 11b sends instructions to the receiving station 12b over the optical fiber 32 to measure OSNRs and Q factors and to send back the measurements.

The receiving station 12a, as instructed by the transmitting station 11b, measures the OSNRs and Q factors of received optical signals in the measurement section 71 and sends back the measurements to the transmitting station over the optical fiber 31.

The transmitting station 11b analyzes the measurements sent from the receiving station and then produces a filter control signal, which is sent to the optical tunable filter 23 over the optical fiber 32. In the optical tunable filter, the transmission factor versus wavelength characteristic is controlled in accordance with the filter control signal.

The signal for the transmitting station 11b to control the receiving station or the optical tunable filter 23 may be sent in such a format as shown in FIG. 7A, for example, as with the first embodiment.

In the present embodiment, as described above, the receiving station 12b measures the transmission characteristics (OSNRs and Q factors) as instructed by the transmitting station 11b and, based on the measurements, the transmitting station controls the pre-emphasis and the wavelength characteristic of the optical tunable filter 23, thereby equalizing and optimizing the transmission characteristics in the WDM optical communication system shown in FIG. 1.

Figure 16:
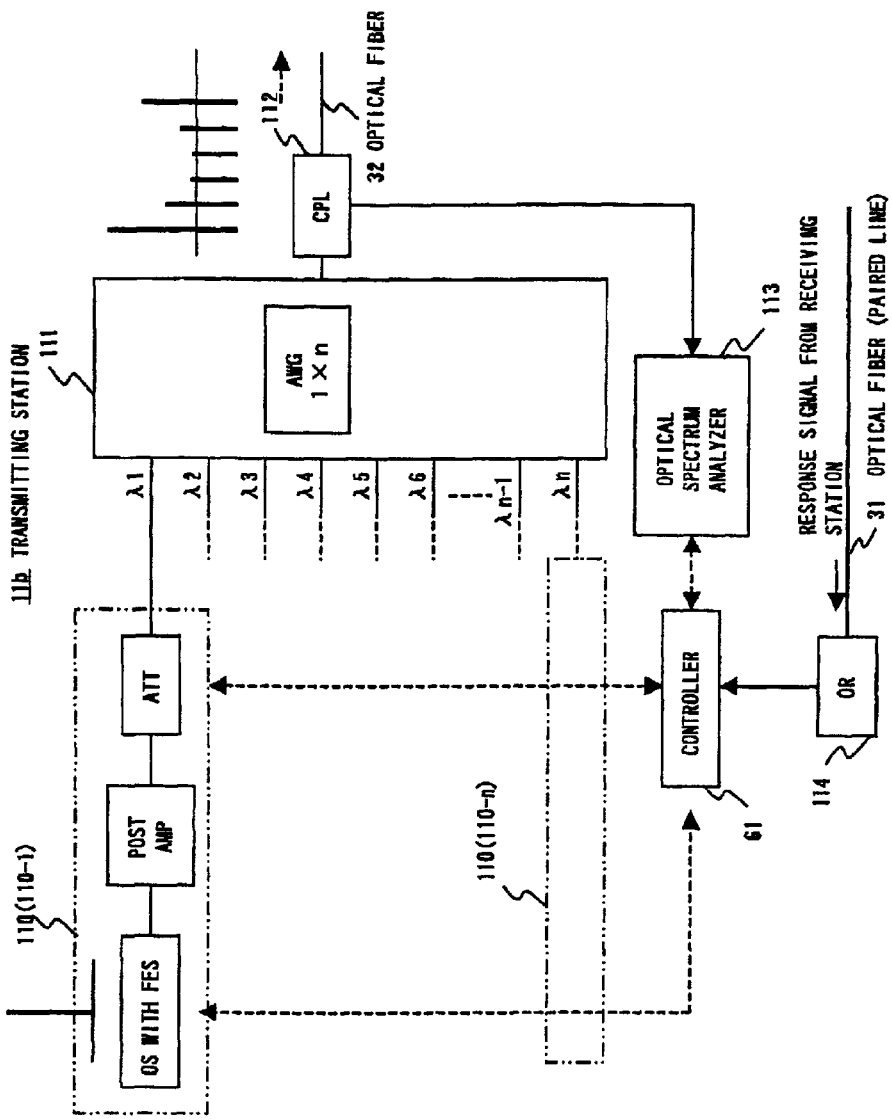
FIG. 16 shows an arrangement of the transmitting station in the second embodiment of the invention.
Figure 18:
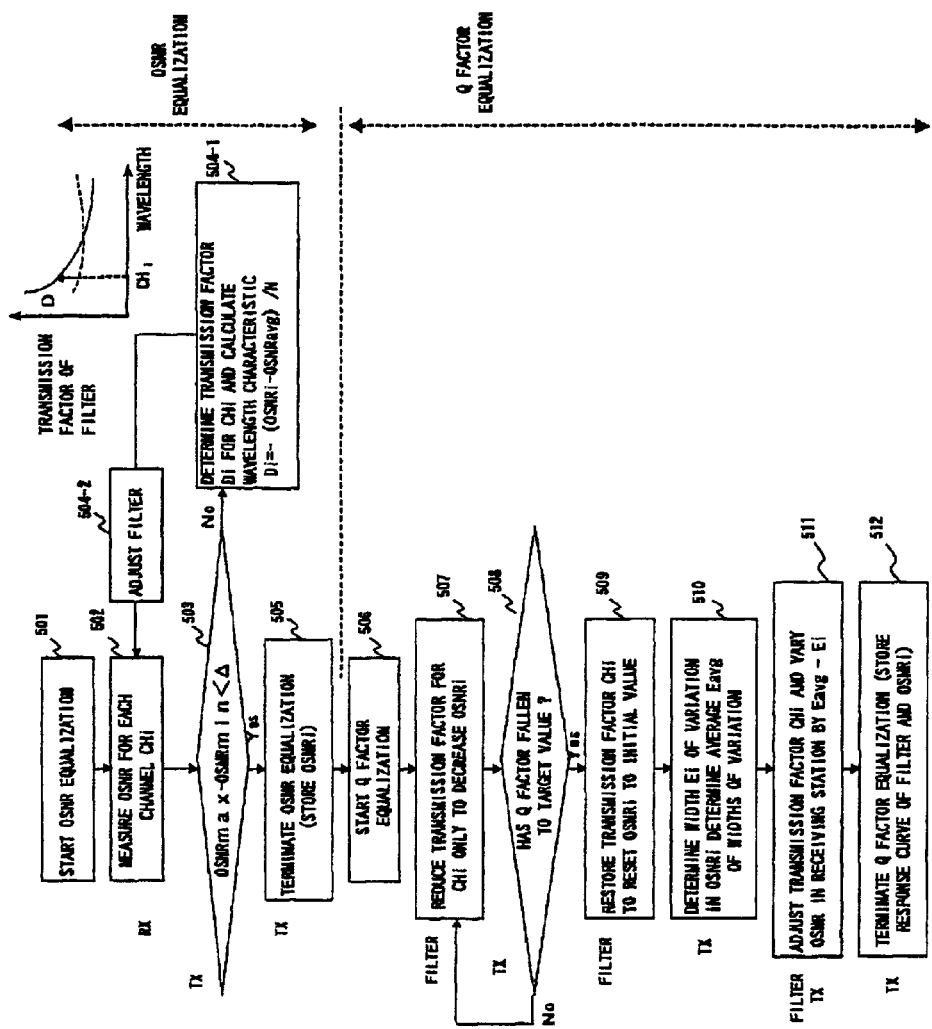
FIG. 18 is a flowchart for the algorithm of control operation (Q equalization based on only filters prior to the start of the system operation) in the second embodiment of the invention.
Figure 19:
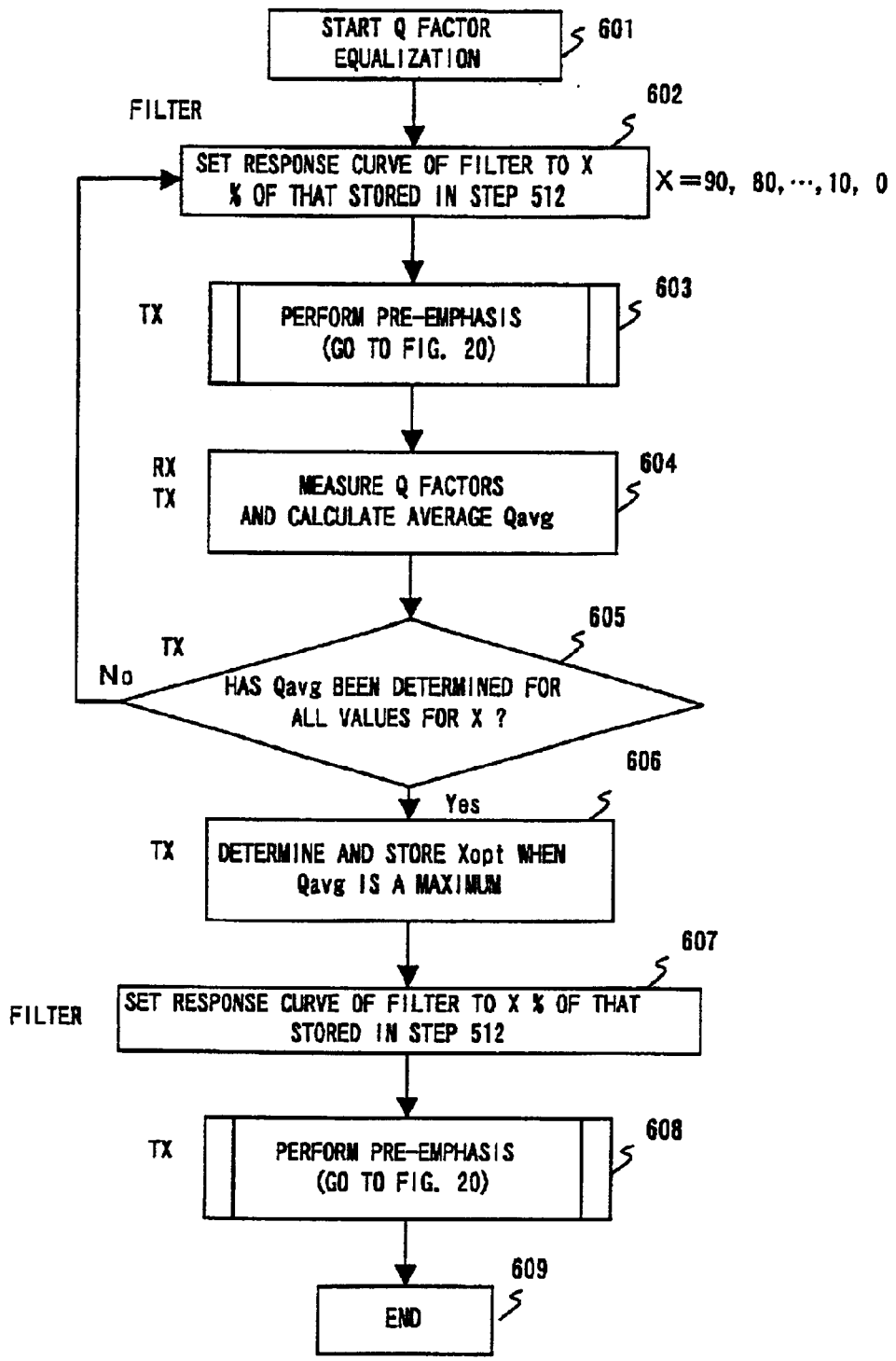
FIG. 19 is a flowchart for the algorithm of control operation (Q equalization based on filters prior to the start of the system operation and pre-emphasis) in the second embodiment of the invention.
Figure 20:
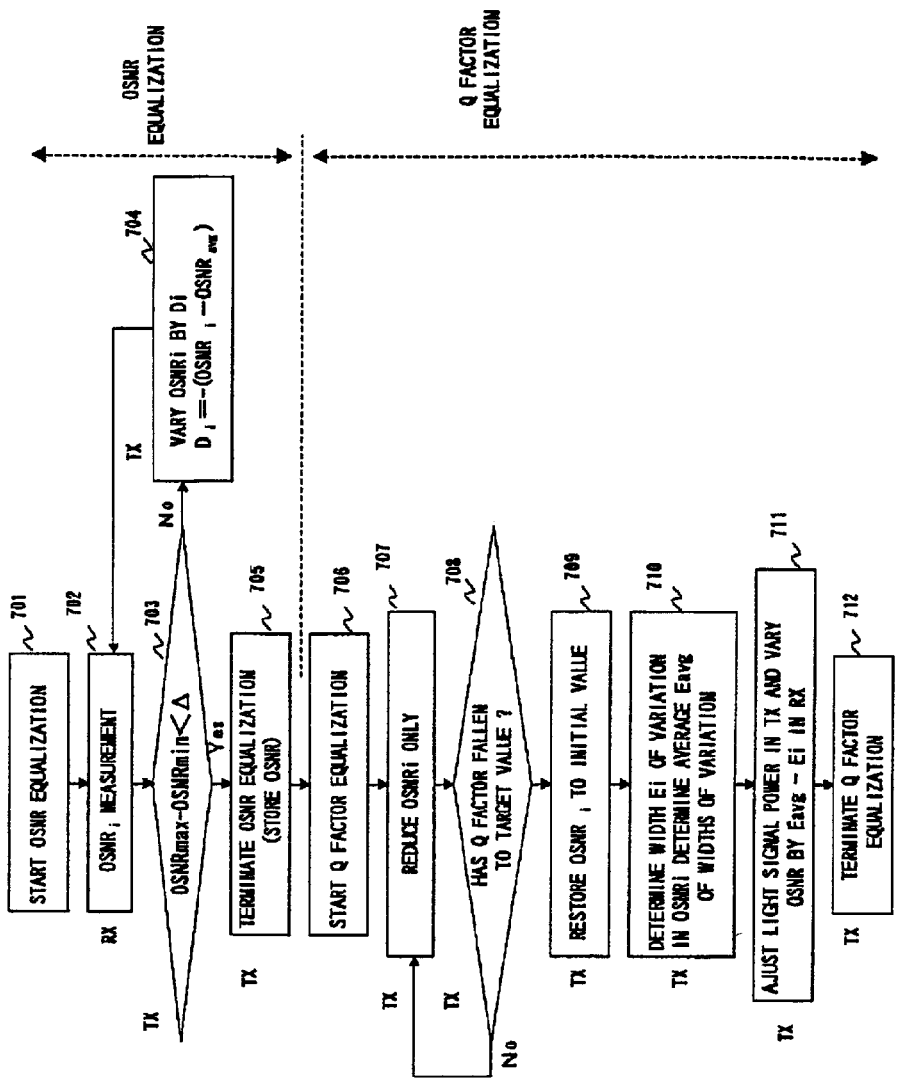
FIG. 20 is a detailed flowchart for the processing in steps 603 and 608 in FIG. 19 (Q equalization based on pre-emphasis)

In FIGS. 16 and 17, arrangements of the transmitting station 11b and the receiving station 12b, respectively, are shown. Here, only arrangements which differ from those in FIGS. 5 and 6 will be briefly described. The optical tunable filter 23 has the same arrangement as that shown in FIG. 4.

The transmitting station 11b shown in FIG. 16 has the same arrangement as in FIG. 5, except that the controller 61 controls the receiving station 12b and the optical tunable filter 23. The signal sent from the receiving station over the optical fiber 31 is a response signal rather than a control signal.

The receiving station 12b shown in FIG. 17 has the same arrangement as in FIG. 6, except that the controller 130 has no function of analyzing the measurements of OSNRs and Q factors.

The signal sent to the transmitting station over the optical fiber 31 is a response signal rather than a control signal.

FIGS. 18 through 21 show control operations for equalizing the transmission characteristics in the second embodiment. These control operations remain basically unchanged from those shown in FIGS. 8 through 11, except that it is the transmitting station, and not the receiving station, that exercises control. Thus, a detailed description thereof is omitted here.

The second embodiment has been briefly described above. Thus, even if the subject that exercises control is changed from the receiving station to the transmitting station, the filter control and the pre-emphasis control can be carried out in the optimum proportion of Xopt to 1−Xopt, ensuring that the transmission characteristics are equalized and optimized.

[Third Embodiment]

Figure 8:
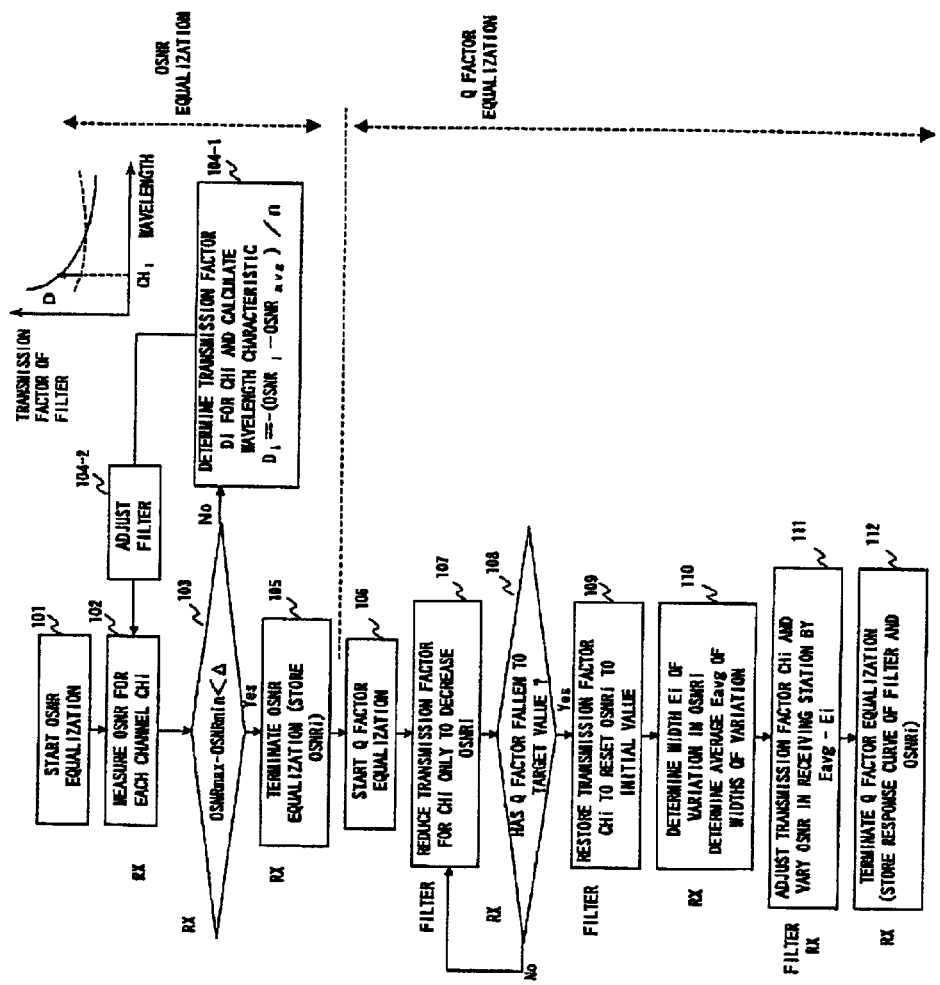
FIG. 8 is a flowchart for the algorithm of control operation (Q equalization using only filters prior to the start of the operation of the communication system) in the first embodiment of the invention.

In the first embodiment, as shown in FIGS. 8, 9 and 10, before starting the operation of the system, the equalization of Q factors is first performed based on control of the optical tunable filter 23 alone and then the equalization and optimization of Q factors are performed based on both the filter control and the pre-emphasis control. However, this is not restrictive. A modification may be made such that the Q factor equalization is first performed through the pre-emphasis control only and then are the Q factor equalization and optimization performed through both the filter control and the pre-emphasis control with reference to the amounts of pre-emphasis at the time of the first pre-emphasis control. We illustrate this modification in FIGS. 22, 23 and 24 as a third embodiment of the present invention.

Figure 22:
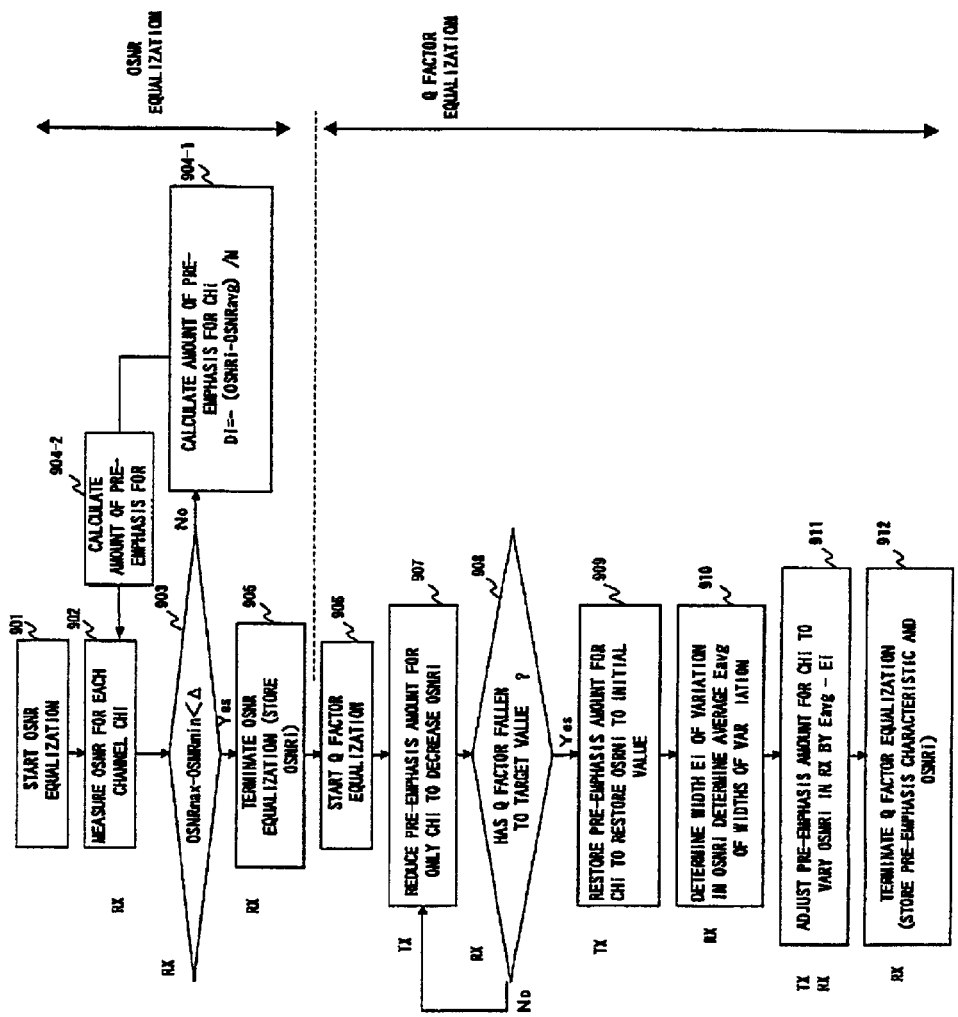
FIG. 22 is a flowchart for the algorithm of control operation (Q equalization based on only filters prior to the start of the system operation) in a third embodiment of the invention.
Figure 23:
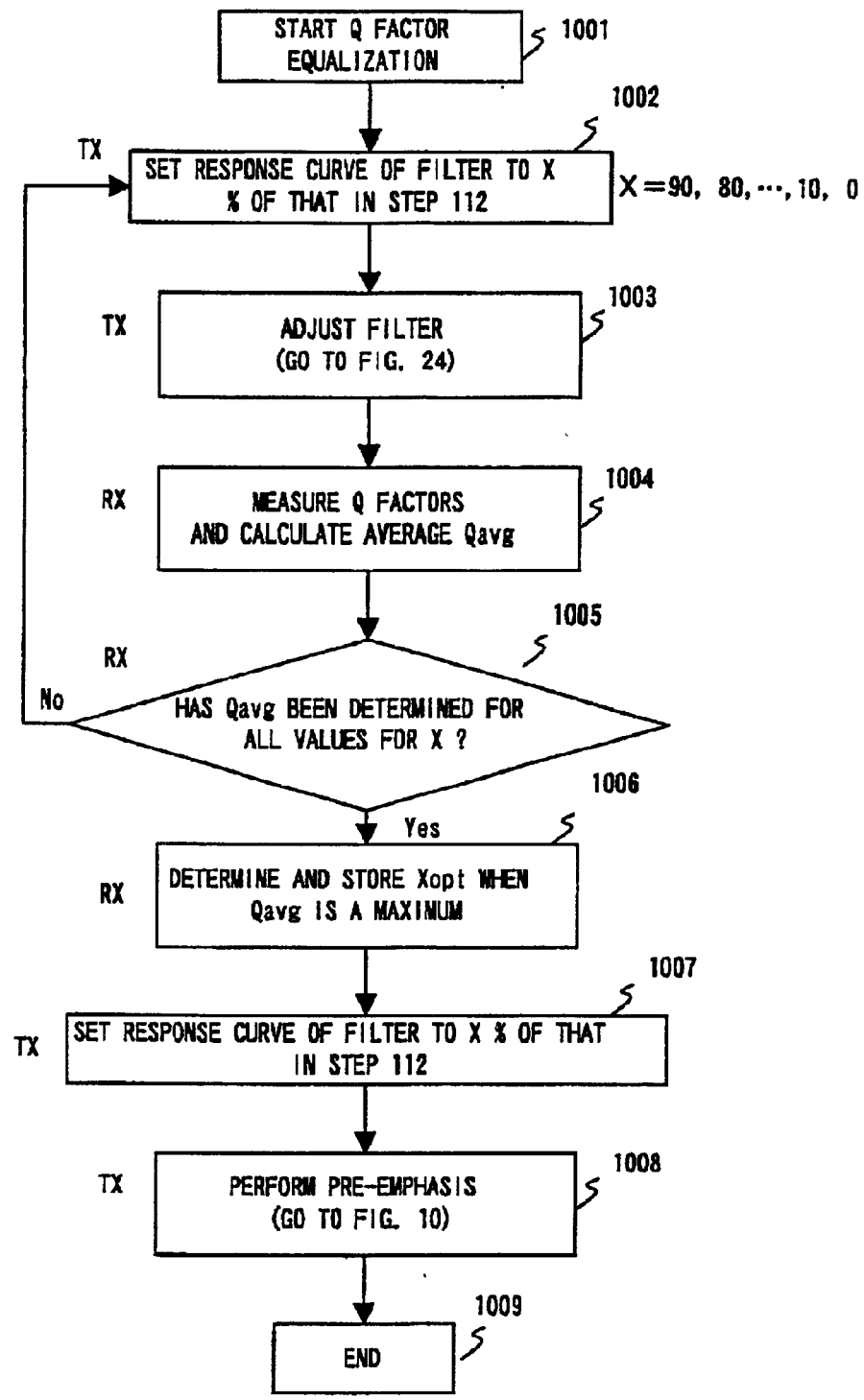
FIG. 23 is a flowchart for the algorithm of control operation (Q equalization based on filters prior to the start of the system operation and pre-emphasis) in the third embodiment of the invention.
Figure 24:
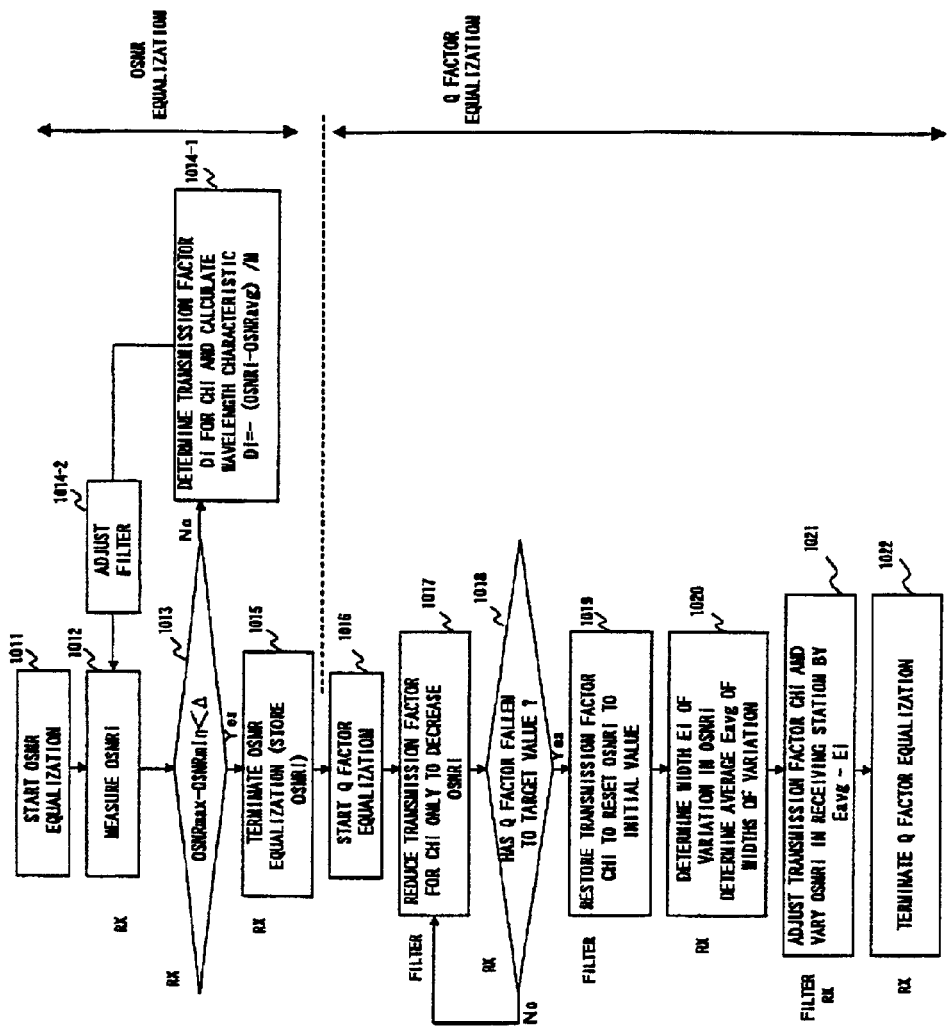
FIG. 24 is a detailed flowchart for the processing in step 1003 in FIG. 23 (Q equalization based on filters)

FIG. 22 is a flowchart illustrating the algorithm for control operations in the third embodiment (the Q factor equalization based on the pre-emphasis control only prior to the start of the system operation). FIG. 23 is a flowchart illustrating the algorithm for control operations in the third embodiment (the Q factor equalization based on the filter control and the pre-emphasis control only prior to the start of the system operation). FIG. 24 is a detailed flowchart for the processing in step 1003 in FIG. 23 (the Q factor equalization based on the filter control).

The third embodiment and the first embodiment differ from each other only in that the first Q equalization is made only through the filter control or the pre-emphasis control. A detailed description of the third embodiment is omitted herein. Such a third embodiment will also provide the same advantages as the first embodiment.

Of course, the second embodiment may also be modified such that the Q factor equalization is first performed through only the pre-emphasis control and then the Q factor equalization and optimization are performed through both the filter control and the pre-emphasis control with reference to the amounts of pre-emphasis at the time of the first pre-emphasis control.

[Other Embodiments]

(1) In the above embodiments, as the control signal transmission method, the control signal is transmitted in the overhead as shown in FIG. 7A; however, this is not restrictive. In the present invention, basically the control signal may be transmitted in any form. The preferred transmission methods include superimposing the control signal on a main signal as shown in FIG. 7B and using a dedicated control signal wavelength different from main signal wavelengths as shown in FIG. 7C in addition to the method shown in FIG. 7A.

Figure 25:
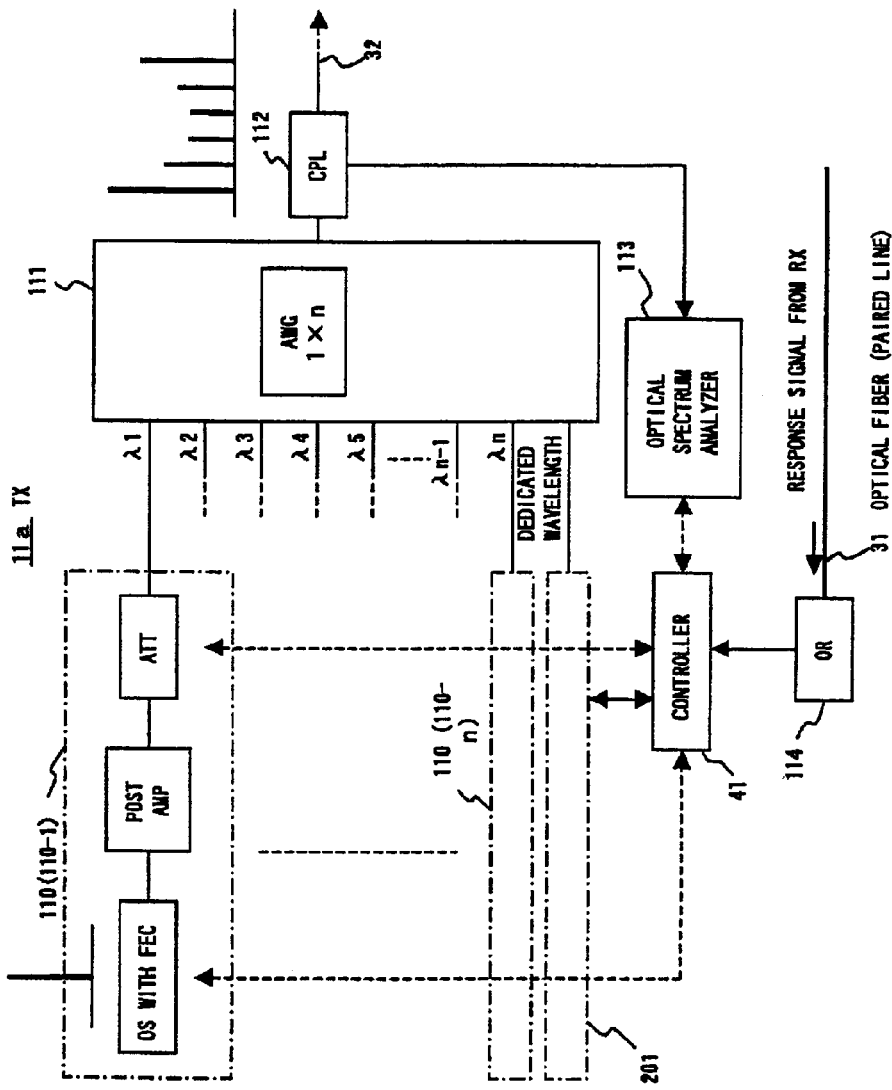
FIG. 25 shows an arrangement of a transmitting station in a fourth embodiment of the invention.
Figure 26:
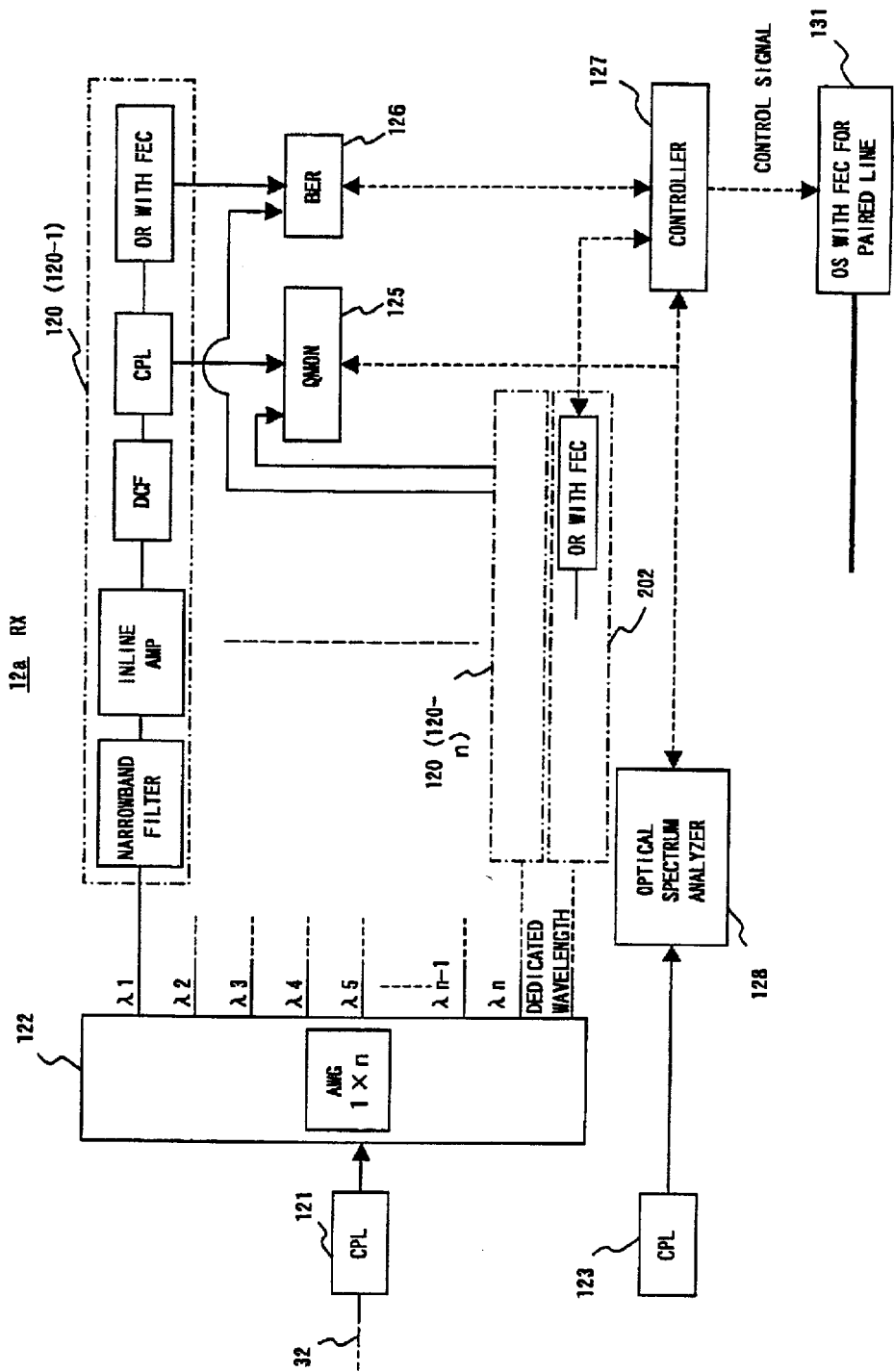
FIG. 26 shows an arrangement of a receiving station in the fourth embodiment of the invention.

FIGS. 25 and 26 shows the arrangements of transmitting and receiving stations in the case where a control signal is transmitted via a dedicated wavelength. A block 201 is added to the transmitting station shown in FIG. 5 to transmit the control signal-dedicated wavelength, while a block 202 is added to the receiving station shown in FIG. 6 to receive the control signal-dedicated wavelength. Each of the AWGs in the transmitting and receiving stations is also provided with a terminal dedicated to the control signal.

(2) Although, in the receiving station shown in FIG. 6, the Q factor monitor 125 and the BER measurement device 126 are each common to all the blocks 120-1 to 120-n, they may be provided for each of these blocks.

(3) Although the embodiments have been described as evaluating the transmission characteristics on the basis of Q factors in the receiving station, it is also possible to evaluate the transmission characteristics on the basis of BER values in the receiving station. The BER values can be readily observed by counting error corrections.

According to the present invention, as described above, since not only the pre-emphasis in a transmitting station, but also the transmission factor versus wavelength characteristic of optical tunable filters placed along an optical transmission path, is controlled, the burden imposed on the pre-emphasis processing in equalizing the transmission characteristic can be alleviated very effectively. This will also allow design criteria to be lowered for repeating systems.

Moreover, controlling both the pre-emphasis and the transmission factor versus wavelength characteristic will provide transmission characteristics of better quality than with the pre-emphasis only.

Furthermore, it is also possible to predetermine the optimum allocation of control between the control of the pre-emphasis in a transmitting station and the control of the wavelength characteristic of optical tunable filters in equalizing the transmission characteristics for all channels. By so doing, the pre-emphasis and the wavelength characteristic can be controlled in accordance with the optimum allocation. As a result, not only can the transmission characteristic be equalized, but also the best transmission quality can be provided all the time.

What is claimed is:

1. A transmission characteristic equalizing system, comprising:

at least one optical tunable filter having a variable transmission factor versus wavelength characteristic and placed along an optical transmission path between a transmitting station and a receiving station in a wavelength division multiplexing optical communication system;

a transmission characteristic measurement unit measuring transmission characteristics of optical signals of different wavelengths transmitted over the optical transmission path; and a transmission characteristic control unit, based on measurements made by the transmission characteristic measurement unit, controlling amounts of pre-emphasis in the transmitting station and the transmission factor versus wavelength characteristic of the optical tunable filter to thereby equalize the transmission characteristics for the optical signals, wherein the transmission characteristic control unit calculates an optimum allocation between a controlled variable of the amounts of pre-emphasis in the transmitting station and a controlled amount of the transmission factor versus wavelength characteristic of the optical tunable filter and controls the amounts of pre-emphasis and the transmission factor versus wavelength characteristic according to the optimum allocation to thereby equalize and optimize the transmission characteristics, and wherein the transmission characteristic measurement unit measures first and second transmission characteristic values having a correlation with each other as the transmission characteristics, and the transmission characteristic control unit first controls only the transmission factor versus wavelength characteristic of the optical tunable filter to equalize the first transmission characteristic values and then temporarily equalize the second transmission characteristic values with reference to the equalized first transmission characteristic values, then calculates the optimum allocation with reference to the transmission factor versus wavelength characteristic of the optical tunable filter at a time of temporary equalization of the second transmission characteristic values, and controls the transmission factor versus wavelength characteristic of the optical tunable filter and the amounts of pre-emphasis in the transmitting station according to the optimum allocation to thereby equalize the second transmission characteristic values.

2. The system according to claim 1, wherein the process of controlling only the transmission factor versus wavelength characteristic of the optical tunable filter to temporarily equalize the second transmission characteristic values is performed by reducing a transmission factor of the optical tunable filter for each wavelength to decrease the first transmission characteristic values and thereby lower the second transmission characteristic values to a given target value, restoring the transmission factor of the optical tunable filter to an original value thereof to restore the first transmission characteristic values to initial values thereof, determining widths of variations of the first transmission characteristic values at that time, determining an average of the widths of variations of the first transmission characteristic values over all wavelengths, and adjusting the transmission factor of the optical tunable filter for each wavelength to vary each of the first transmission characteristic values by a difference between the average and a corresponding width of variation.

3. The system according to claim 1, wherein the process of calculating the optimum allocation is performed, with the transmission factors of the optical tunable filter to which reference is made assumed as 100%, by controlling the amounts of pre-emphasis in the transmitting station to equalize the second transmission characteristic values each time the transmission factors of the optical tunable filter are reduced by a percentage, calculating the average of the equalized second transmission characteristic values over all wavelengths each time the transmission factors of the optical tunable filter are reduced by the percentage, and using the percentage of a reduction in the transmission factors when the average is a maximum as the optimum allocation.

4. The system according to claim 3, wherein the process of controlling the amounts of pre-emphasis in the transmitting station to equalize the second transmission characteristic values is performed by controlling the amounts of pre-emphasis to equalize the first transmission characteristic values, adjusting the amounts of pre-emphasis for each wavelength to decrease the first transmission characteristic values and thereby temporarily lower the second transmission characteristic values to a given target value, restoring the amounts of pre-emphasis to original values thereof to restore the first transmission characteristic values to initial values thereof, determining widths of variations of the first transmission characteristic values at that time, determining an average of the widths of variations of the first transmission characteristic values for all wavelengths, and adjusting the amount of pre-emphasis for each wavelength to vary each of the first transmission characteristic values by a difference between the average and a corresponding width of variation.

5. The system according to claim 1, wherein the transmission characteristic control unit calculates the optimum allocation prior to a start of an operation of the communication system and controls the amounts of pre-emphasis and the transmission factor versus wavelength characteristic according to the optimum allocation during the operation of the communication system to thereby equalize and optimize the transmission characteristics.

6. The system according to claim 5, wherein the process of controlling the amounts of pre-emphasis and the transmission factor versus wavelength characteristic according to the optimum allocation during the operation of the communication system is performed by adjusting the amount of pre-emphasis or a transmission factor for each wavelength to decrease the first transmission characteristic values and thereby temporarily lower the second transmission characteristic values to a given target value, restoring the amount of pre-emphasis or the transmission factor to original values thereof to restore the first transmission characteristic values to initial values thereof, determining widths of variations of the first transmission characteristic values at that time, determining an average of the widths of variations of the first transmission characteristic values over all wavelengths, adjusting the transmission factor for each wavelength to vary the first transmission characteristic values by an amount corresponding to the optimum allocation, and adjusting the amount of pre-emphasis for each wavelength to further vary the first transmission characteristic values by an amount corresponding to the optimum allocation.

7. The system according to claim 6, wherein, assuming a ratio representing the optimum allocation between a controlled variable of the transmission factor versus wavelength characteristic and the controlled variable of the amounts of pre-emphasis to be X to 1−X, a variation in the first transmission characteristic values by control of the wavelength characteristic according to the optimum allocation is a product of a difference and X, and the variation in the first transmission characteristic values by control of the amounts of pre-emphasis according to the optimum allocation is a product of the difference and 1−X.

8. The system according to claim 6, wherein the given target value is a minimum value of the second transmission characteristic values specified by the communication system.

9. The system according to claim 8, wherein the first transmission characteristic values are optical signal to noise ratios (OSNR), and the second transmission characteristic values are Q factors.

10. The system according to claim 8, wherein the first transmission characteristic values are optical signal to noise ratios (OSNR), and the second transmission characteristic values are bit error rates (BER).

11. The system according to claim 1, wherein the transmission characteristic measurement unit is provided in the receiving station.

12. The system according to claim 1, wherein the transmission characteristic control unit is provided in the receiving station and the amounts of pre-emphasis in the transmitting station and the transmission factor versus wavelength characteristic of the optical tunable filter are controlled by the receiving station.

13. The system according to claim 1, wherein the transmission characteristic control unit is provided in the transmitting station and the amounts of pre-emphasis in the transmitting station and the transmission factor versus wavelength characteristic of the optical tunable filter are controlled by the transmitting station.

14. The system according to claim 1, wherein the amounts of pre-emphasis in the transmitting station are controlled via one of an overhead signal, a control signal superimposed on a main signal amplitude, and a dedicated control signal.

15. The system according to claim 1, wherein the transmission factor versus wavelength characteristic of the optical tunable filter is controlled via one of an overhead signal, a control signal superimposed on a main signal amplitude, and a dedicated control signal.

16. A method of equalizing transmission characteristics for optical signals, comprising:

placing at least one optical tunable filter having a variable transmission factor versus wavelength characteristic along an optical transmission path between a transmitting station and a receiving station in a wavelength division multiplexing optical communication system;

measuring transmission characteristics of optical signals of different wavelengths transmitted over the optical transmission path; and controlling, based on measurements of the transmission characteristics, amounts of pre-emphasis in the transmitting station and the transmission factor versus wavelength characteristic of the optical tunable filter to thereby equalize the transmission characteristics for the optical signals, in the controlling based on the measurements of the transmission characteristics operation, calculating an optimum allocation between a controlled variable of the amounts of pre-emphasis in the transmitting station and a controlled amount of the transmission factor versus wavelength characteristic of the optical tunable filter and controlling the amounts of pre-emphasis and the transmission factor versus wavelength characteristic according to the optimum allocation to thereby equalize and optimize the transmission characteristics, wherein, in the measuring of transmission characteristics of optical signals operation, first and second transmission characteristic values having a correlation with each other are measured as the transmission characteristics, and, in the controlling based on the measurements of the transmission characteristics operation, only the transmission factor versus wavelength characteristic of the optical tunable filter is controlled to equalize the first transmission characteristic values and then temporarily equalize the second transmission characteristic values with reference to the equalized first transmission characteristic values, then the optimum allocation is calculated with reference to the transmission factor versus wavelength characteristic of the optical tunable filter at a time of temporary equalization of the second transmission characteristic values, and the transmission factor versus wavelength characteristic of the optical tunable filter and the amounts of pre-emphasis in the transmitting station are controlled according to the optimum allocation to thereby equalize the second transmission characteristic values.

17. The method according to claim 16, wherein, the process in the controlling based on the measurements of the transmission characteristics operation of the controlling only the transmission factor versus wavelength characteristic of the optical tunable filter to temporarily equalize the second transmission characteristic values is performed by reducing a transmission factor of the optical tunable filter for each wavelength to decrease the first transmission characteristic values and thereby lower the second transmission characteristic values to a given target value, restoring the transmission factor of the optical tunable filter to an original value thereof to restore the first transmission characteristic values to initial values thereof, determining widths of variations of the first transmission characteristic values at that time, determining an average of the widths of variations of the first transmission characteristic values over all wavelengths, and adjusting the transmission factor of the optical tunable filter for each wavelength to vary each of the first transmission characteristic values by a difference between the average and a corresponding width of variation.

18. The method according to claim 16, wherein the process in the controlling based on the measurements of the transmission characteristics operation of calculating the optimum allocation is performed, with the transmission factors of the optical tunable filter to which reference is made assumed as 100%, by controlling the amounts of pre-emphasis in the transmitting station to equalize the second transmission characteristic values each time the transmission factors of the optical tunable filter are reduced by a percentage, calculating the average of the equalized second transmission characteristic values over all wavelengths each time the transmission factors of the optical tunable filter are reduced by the percentage, and using the percentage of a reduction in the transmission factors when the average is a maximum as the optimum allocation.

19. The method according to claim 16, wherein the process in the controlling based on the measurements of the transmission characteristics operation of controlling the amounts of pre-emphasis in the transmitting station to equalize the second transmission characteristic values is performed by controlling the amounts of pre-emphasis to equalize the first transmission characteristic values, adjusting the amounts of pre-emphasis for each wavelengths to decrease the first transmission characteristic values and thereby temporarily lower the second transmission characteristic values to a given target value, restoring the amounts of pre-emphasis to original values thereof to restore the first transmission characteristic values to initial values thereof, determining widths of variations of the first transmission characteristic values at that time, determining an average of the widths of variations of the first transmission characteristic values for all wavelengths, and adjusting the amount of pre-emphasis for each wavelength to vary each of the first transmission characteristic values by a difference between the average and a corresponding width of variation.

20. The method according to claim 16, wherein, in the controlling based on the measurements of the transmission characteristics operation, the optimum allocation is calculated prior to a start of an operation of the communication system and the amounts of pre-emphasis and the transmission factor versus wavelength characteristic are controlled according to the optimum allocation during the operation of the communication system to thereby equalize and optimize the transmission characteristics.

21. The method according to claim 20, wherein the process in the controlling based on the measurements of the transmission characteristics operation of controlling the amounts of pre-emphasis and the transmission factor versus wavelength characteristic according to the optimum allocation during the operation of the communication system is performed by adjusting the amount of pre-emphasis or a transmission factor for each wavelength to decrease the first transmission characteristic values and thereby temporarily lower the second transmission characteristic values to a given target value, restoring the amount of pre-emphasis or the transmission factor to original values thereof to restore the first transmission characteristic values to initial values thereof, determining widths of variations of the first transmission characteristic values at that time, determining an average of the widths of variations of the first transmission characteristic values over all wavelengths, adjusting the transmission factor for each wavelength to vary the first transmission characteristic values by an amount corresponding to the optimum allocation, and adjusting the amount of pre-emphasis for each wavelength to further vary the first transmission characteristic values by an amount corresponding to the optimum allocation.

22. The method according to claim 21, wherein, assuming a ratio representing the optimum allocation between a controlled variable of the transmission factor versus wavelength characteristic and the controlled variable of the amounts of pre-emphasis to be X to 1−X, a variation in the first transmission characteristic values by control of the wavelength characteristic according to the optimum allocation is a product of a difference and X, and the variation in the first transmission characteristic values by control of the amounts of pre-emphasis according to the optimum allocation is a product of the difference and 1−X.

23. The method according to claim 21, wherein the given target value is a minimum value of the second transmission characteristic values specified by the communication system.

24. The method according to claim 16, wherein the first transmission characteristic values are optical signal to noise ratios (OSNR), and the second transmission characteristic values are Q factors.

25. The method according to claim 16, wherein the first transmission characteristic values are optical signal to noise ratios (OSNR), and the second transmission characteristic values are bit error rates (BER).

26. The method according to claim 16, wherein the measurements in the measuring of transmission characteristics of optical signals operation are made by the receiving station.

27. The method according to claim 16, wherein control in the controlling based on the measurements of the transmission characteristics operation of the amounts of pre-emphasis in the transmitting station and the transmission factor versus wavelength characteristic of the optical tunable filter is performed by the receiving station.

28. The method according to claim 16, wherein control in the controlling based on the measurements of the transmission characteristics operation of the amounts of pre-emphasis in the transmitting station and the transmission factor versus wavelength characteristic of the optical tunable filter is performed by the transmitting station.

29. A transmission characteristic equalizing system, comprising:

an optical tunable filter having a variable transmission factor versus wavelength characteristic and placed along an optical transmission path between a transmitting station and a receiving station in a wavelength division multiplexing optical communication system;

a transmission characteristic measurement unit to measure transmission characteristics of optical signals of different wavelengths transmitted over the optical transmission path; and a transmission characteristic control unit to match the transmission characteristics for the optical signals according to measurements from the transmission characteristic measurement unit, the transmission characteristic control unit calculating an optimum allocation between a controlled variable of amounts of pre-emphasis in the transmitting station and a controlled amount of a transmission factor versus wavelength characteristic of the optical tunable filter and controlling the amounts of pre-emphasis and the transmission factor versus wavelength characteristic according to the optimum allocation, wherein the transmission characteristic measurement unit measures first and second transmission characteristic values having a correlation with each other as the transmission characteristics, and the transmission characteristic control unit first controls only the transmission factor versus wavelength characteristic of the optical tunable filter to equalize the first transmission characteristic values and then temporarily equalize the second transmission characteristic values with reference to the equalized first transmission characteristic values, then calculates the optimum allocation with reference to the transmission factor versus wavelength characteristic of the optical tunable filter at a time of temporary equalization of the second transmission characteristic values, and controls the transmission factor versus wavelength characteristic of the optical tunable filter and the amounts of pre-emphasis in the transmitting station according to the optimum allocation to thereby equalize the second transmission characteristic values.

30. A method of equalizing transmission characteristics for optical signals, comprising:

placing an optical tunable filter having a variable transmission factor versus wavelength characteristic along an optical transmission path between a transmitting station and a receiving station in a wavelength division multiplexing optical communication system;

measuring transmission characteristics of optical signals of different wavelengths transmitted over the optical transmission path; and matching the transmission characteristics for the optical signals based on measurements of transmission characteristics, by calculating an optimum allocation between a controlled variable of amounts of pre-emphasis in the transmitting station and a controlled amount of a transmission factor versus wavelength characteristic of the optical tunable filter and by controlling the amounts of pre-emphasis and the transmission factor versus wavelength characteristic according to the optimum allocation, wherein, in the measuring of transmission characteristics of optical signals operation, first and second transmission characteristic values having a correlation with each other are measured as the transmission characteristics, and, in the controlling based on the measurements of the transmission characteristics operation, only the transmission factor versus wavelength characteristic of the optical tunable filter is controlled to equalize the first transmission characteristic values and then temporarily equalize the second transmission characteristic values with reference to the equalized first transmission characteristic values, then the optimum allocation is calculated with reference to the transmission factor versus wavelength characteristic of the optical tunable filter at a time of temporary equalization of the second transmission characteristic values, and the transmission factor versus wavelength characteristic of the optical tunable filter and the amounts of pre-emphasis in the transmitting station are controlled according to the optimum allocation to thereby equalize the second transmission characteristic values.

* * * * *